United States Patent [19]

Grinberg et al.

[11] Patent Number: 4,524,428
[45] Date of Patent: Jun. 18, 1985

[54] MODULAR INPUT-PROGRAMMABLE LOGIC CIRCUITS FOR USE IN A MODULAR ARRAY PROCESSOR

[75] Inventors: Jan Grinberg; Siegfried Hansen, both of Los Angeles, Calif.

[73] Assignee: Hughes Aircraft Company, El Segundo, Calif.

[21] Appl. No.: 342,639

[22] Filed: Jan. 26, 1982

[51] Int. Cl.$^3$ .............................................. G06F 7/48
[52] U.S. Cl. .................................................. 364/900
[58] Field of Search ............................. 364/200, 900

[56] References Cited

U.S. PATENT DOCUMENTS

| 3,979,728 | 9/1976 | Reddaway | 364/200 |
| 4,065,808 | 12/1977 | Schomberg et al. | 364/200 |
| 4,144,566 | 3/1979 | Timsit | 364/200 |
| 4,174,514 | 11/1979 | Sternberg | 364/200 |
| 4,215,401 | 7/1980 | Holsztynski et al. | 364/200 |
| 4,251,861 | 2/1981 | Mago | 364/200 |
| 4,384,273 | 5/1983 | Ackland et al. | 364/900 |
| 4,412,303 | 10/1983 | Barnes et al. | 364/900 |

Primary Examiner—Thomas M. Heckler
Attorney, Agent, or Firm—Anthony W. Karambelas

[57] ABSTRACT

A general circuit design for the various functional types of modules used in the Elemental Processors of a Modular Array Processor. These modules nominally include an input-programmable logic circuit and closely associated memory register. They also include a common means of transferring data to and from a data bus for communicating data to the other modules present within their respective Elemental Processors. The various functional types of modules are realized through the use of logic circuits of different specific designs. Each particular type of logic circuit is designed to implement all of the related logical and data manipulative operations necessary to provide a general data processing function, such as those of accumulator, memory, counter, and comparator. This allows the logic circuit to receive data from the data bus, perform a selected data manipulation operation consistent with the module's functional type on the data received in combination with data stored in the memory register and to store the resultant data in the memory register, and to transmit the stored resultant data back to the data bus.

17 Claims, 18 Drawing Figures

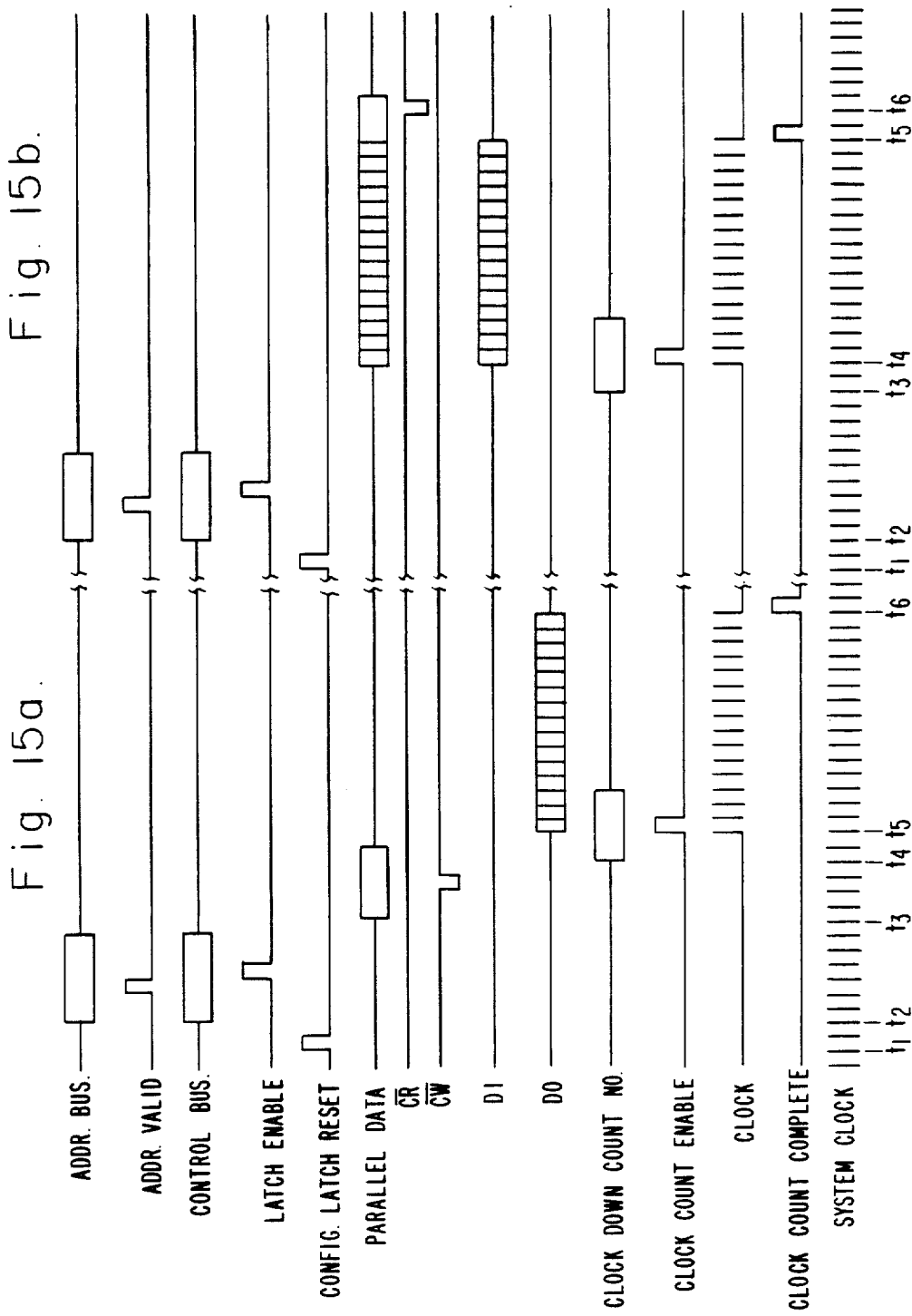

MODULAR INPUT-PROGRAMMABLE LOGIC CIRCUITS FOR USE IN A MODULAR ARRAY PROCESSOR

CROSS REFERENCE TO RELATED APPLICATIONS (1) U.S. patent application Ser. No. 342,360 filed as of even date herewith entitled "An Array Processor Architecture Utilizing Modular Elemental Processors," J. Grinberg, et al., and assigned to the assignee of the present invention.

(2) U.S. patent application Ser. No. 342,640 filed of even date herewith entitled "Data Exchange Subsystem for Use in a Modular Array Processor," S. Hansen, assigned to the assignee of the present invention.

(3) U.S. patent application Ser. No. 342,671 filed of even data herewith entitled "Segregator Functional Plane for Use in a Modular Array Processor," S. Hansen, et al., and assigned to the assignee of the present invention.

BACKGROUND OF THE INVENTION

The present invention generally relates to the field of computer aided data analysis and, in particular, to the highly specialized computers capable of processing two dimensionally structured data sets, generally referred to as images, that are known as Cellular Array Processors (CAP).

In the field of image processing, the Cellular Array Processor is generally well-known as a type of computer system whose architecture is particularly suited for the task of image processing. Although the specific design may differ substantially between different implementations, the general architecture of the Cellular Array Processor is quite distinctive. Typically, a system will include a highly specialized array processor that is controlled by a control processor of conventional design. The array processor, in turn, is formed from a large number of elemental processors that are distributed as individual cells within a regular matrix. (This gives rise to the descriptive name "Cellular Array Processor".) The elemental processors are essentially identical and generally contain a function-programmable logic circuit and memory register. The programmable logic circuit is typically capable of selectively performing a limited number of primitive logic and arithmetic functions, such as "and", "or", "invert", and "rotate" on the data stored in its respective memory register in conjunction with data provided by the control processor. The control processor is linked to the elemental processors via a common instruction bus. Thus, all of the elemental processors operate separately, yet synchronously, in the performance of a common logical function on the data contained in their respective memory registers. (This is commonly referred to as Single Instruction, Multiple Data, or SIMD operation.)

Cellular Array Processor systems are particularly well suited for image processing applications, since the memory registers present in the cellular array permit the digital representation of the image to be mapped directly into the processor. Thus, the spatial interrelationship of the data within the two-dimensionally structured data set is intrinsically preserved. By directing the array processor to perform a selected sequence of SIMD logical operations corresponding to the performance of a desired image processing algorithm, the data at every point in the image can be processed essentially in parallel. Naturally, both the effective processing speed (the product of the number of instructions per second executed by an elemental processor and the number of elemental processors operating simultaneously) and the resolution of the image being processed can be increased directly by the use of additional elemental processors.

Although the Cellular Array Processor architecture is a relatively recent development within the more general field of computer aided data analysis, a substantial number of systems utilizing the architecture have been developed. While many of the systems were specifically designed for general application purposes, quite a number have been designed for considerably more specialized applications. Descriptions of a number of the general application systems can be found in S. F. Reddaway, DAP—A Distributed Processor, IEEE, Proceedings of the First Symposium on Computer Architecture, pp. 61–65 (1973), General Purpose Array Processor, U.S. Pat. No. 3,815,095 issued to Aaron H. Wester on June 4, 1974, K. E. Batcher, Array Processor, U.S. Pat. No. 3,979,728 issued to Stewart Reddaway on Sept. 7, 1976, The Massively Parallel Processor (MPP) System, AIAA, Proceedings of The Computers in Aerospace Conference 2, pp. 93–97 (1979), and Parallel Type Processor with a Stacked Auxiliary Fast Memories, U.S. Pat. No. 4,144,566 issued to Claude Timsit on Mar. 13, 1979. A number of the more specialized systems are described in Floating Point Arithmetic Unit for a Parallel Processing Computer, U.S. Pat. No. 3,701,976 issued to Richard Shivety on Oct. 31, 1972 Network Computer System, U.S. Pat. No. 4,065,808 issued to Hermann Schomberg et al. on Dec. 27, 1977 and Scientific Processor, U.S. Pat. No. 4,101,960 issued to Richard Stokes et al. on July 18, 1978.

In each of these system implementations, a significantly different elemental processor design is used in order to tailor the array processors for their anticipated applications. This is principally due to the extremely wide variety of their possible applications and equally wide variety of subcomponents that can be utilized. However, a common feature of these elemental processors is that a high degree of component interconnection is used in order to optimize the elemental processor processing speed.

The particular disadvantage of using highly optimized elemental processor designs is that any significant change in the anticipated data processing application will require the elemental processors to be substantially redesigned in order to preserve the system's overall data processing capability and efficiency. This is a practical consequence of the fact that the subcomponents are too highly specialized and innerconnected to allow any significant alteration or extension of the elemental processors' component composition.

SUMMARY OF THE INVENTION

An array processor architecture utilizing a distinctly modular elemental processor design has been disclosed in the copending companion application Ser. No. 342,630, now U.S. Pat. No. 4,507,726.

The array processor is comprised of a plurality of modular elemental processors. A data exchange subsystem interconnects the modules of each elemental processor to provide for data transfer. These modules are of a number of different functional types, such as memory and accumulator. These modules are associated so that the elemental processors are architecturally parallel to one another. The principal flow of data within the array processor, based on the simultaneous transfer of data words within the elemental processors, is thereby correspondingly parallel. The modules are also architecturally associated as functional planes that lie transverse to the elemental processors. Each functional plane is thereby comprised of an array of modules that are each otherwise associated with a separate elemental processor. Further, the modules of a given functional plane are of a single functional type. This allows the data of a two-dimensionally structured data set, present within the array processor, to be processed identically and in parallel by a common logical operation as provided and performed by a functional plane.

The array processor is operatively connected to a control processor by an array/control processor interface. This interface allows the control processor to direct the operation of, and exchange data with, the array processor.

The present invention provides a general circuit design for the various functional types of modules. These modules nominally include an input-programmable logic circuit and a closely associated memory register. They also include a common means of transferring data to and from a data bus for communicating data to the other modules present within their respective elemental processors. The various functional types of modules are realized through the use of logic circuits of different specific designs. Each particular type of logic circuit is designed to implement all of the related logical and data manipulative operations necessary to provide a general data processing function, such as those of accumulator, memory, counter, and comparator. This allows the logic circuit to receive data from the data bus, perform a selected data manipulation operation consistent with the module's functional type on the data received in combination with data stored in the memory in combination with data stored in the memory register and to store the resultant data in the memory register, and to transmit stored resultant data back to the data bus.

Thus, an advantage of the present invention is that each module is a substantially independent functional unit within the array processor. This allows the design of the array processor and the specific designs of the logic circuits to be non-interdependent.

Another advantage of the present invention is that through the use of simple bit-serial arithmetic logic in the implementation of the logic circuits, both the common data transfer circuit that is present in each module and the data bus structure present in each elemental processor are substantially simplified.

A further advantage of the present invention is that, by providing each module with a memory register, thereby highly integrating the memory and logic of the array processor, the speed and efficiency of the array processor is enhanced.

Still another advantage of the present invention is that practically any general data processing function can be implemented as an input-programmable logic circuit consistent with the present invention. Thus, practically any functional type of module can be realized.

BRIEF DESCRIPTION OF THE DRAWINGS

These and other attendant advantages of the present invention will become apparent and readily appreciated as the same becomes better understood by reference to the following detailed description when considered in connection with the accompanying drawings, in which like reference numerals designate like parts throughout the figures and wherein:

FIGS. 5b and c are circuit details of open collector and open drain buffer circuits, respectively, that may be used in conjunction with the circuit shown in FIG. 5a.

FIGS. 15a and b are schematic timing diagrams for explaining the serial input/output data exchange operation of the I/O functional plane shown in FIG. 8.

DETAILED DESCRIPTION OF THE INVENTION

I. Overview of the Modular Array Processor Architecture

As previously explained, a general Cellular Array Processor (CAP) system is comprised of two principal components: one, an Array Processor and, two, a Control Processor that is used to direct the operation of the Array Processor. The present invention provides for an Array Processor having a modular, and therefore highly flexible, architectural design that is particularly well suited for use in CAP systems. It should be understood, however, that the present invention is related to the modular architecture disclosed. It is conceptually distinct from any particular physical embodiment, even though it may be best described in physical terms. However, the intended mode of physically embodying the present invention is disclosed in "Three-Dimensionally Structured Microelectronic Device", U.S. Pat. No. 4,275,410 issued to Jan Grinberg et al. on June 23, 1981, and "Parallel Interconnect for Planar Arrays", U.S. Pat. No. 4,239,312 issued to Jon H. Myer et al. on Dec. 16, 1980, both of which are assigned to the assignee of the present invention.

Figure 1:
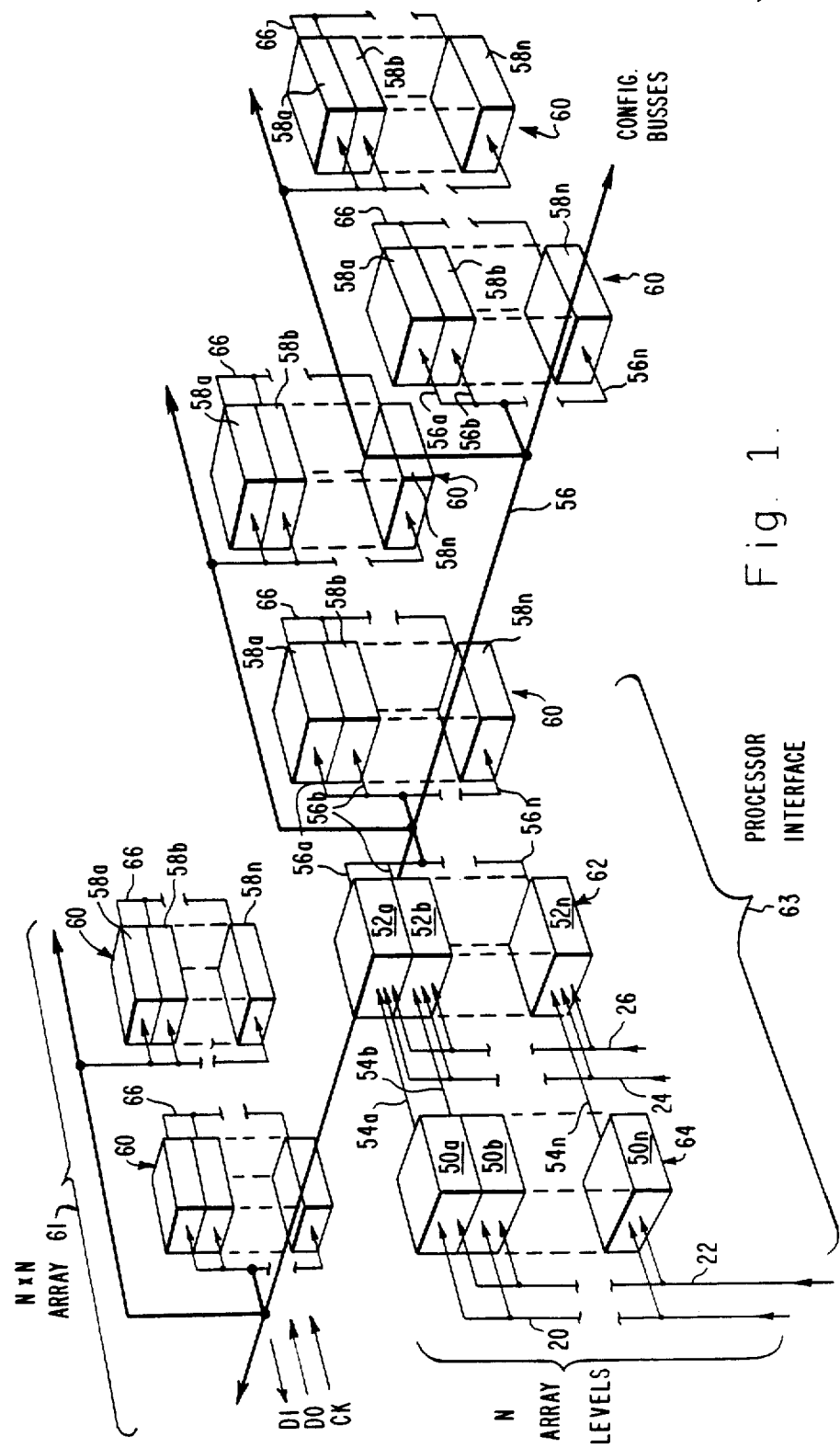
FIG. 1 is a schematic block diagram of a modular array processor.

Accordingly, the Array Processor 61 and Processor Interface 63 of the preferred architectural embodiment of the present invention are shown in FIG. 1. The Array Processor 61 is comprised of a plurality of Elemental Processors 60 that are distributed as cells within a regular $N \times N$ array, thereby topologically matching the distribution of pixels within an image or, equally, the data points present within any two dimensionally structured data set. This is in keeping with conventional CAP system designs.

The Elemental Processors 60 are essentially identical, each being composed of a plurality of Modules 58 operatively interconnected by a Data Exchange Subsystem utilizing a common Data Bus 66. Architecturally, the Elemental Processors 60, in forming the Array Processor 61, occupy a three dimensional space, wherein the Modules 58 are distributed on a plurality of array levels that are parallel to, and overlie, one another. The Elemental Processors 60 extend in parallel across these array levels so that each contains a module in the corresponding $N \times N$ module arrays present on each of the different array levels.

The Modules 58 are, based on their design, generally similar to one another. They are essentially independent units within their respective Elemental Processors 60 and are generically comprised of an input-programmable logic circuit and a closely associated memory register. The logic circuit utilizes bit-serial circuitry to perform a number of related logical and data-manipulative operations on data received from the Data Exchange Subsystem in conjunction with the data present in its corresponding memory register. The logic circuit is specifically programmed, or configured, to perform a particular logical operation by establishing the appropriate combination of logic signals at its inputs. That is, the particular logic state of each of the programmable inputs determines whether corresponding sections or subfunctions of the logic circuit are enabled or disabled, thereby configuring the logic circuit for a particular logical operation.

The Modules 58, however, are of a number of functionally distinct types, each having an input-programmable logic circuit of a different, though basically similar, design. The different functional types of modules may include those that function as memories, accumulators, counters, and comparators. Design examples of these are shown in FIGS. 6, 9, 11, and 12, and will be discussed in greater detail below. It should be understood that practically any basic data manipulation function can be implemented as a Module 58 within an Elemental Processor 60 so long as the design of its logic circuit is consistent with those of the design examples. That is, the input-programmable logic circuit must: (1) be of a standard logic design, such as bit-serial arithmetic, (2) provide all of the logical and data manipulation operations that are required by and consistent with its general functional type, including data storage and transfer, and (3) include a data transfer circuit, typically consisting of a data transmitter and receiver, so that the Modules 58 share a common means of data exchange. Thus, the functional types of modules are not limited to those mentioned above.

The Elemental Processors 60 are thus formed from a plurality of Modules 58 that are operatively interconnected by their respective Data Exchange Subsystems 74. Each plurality of Modules 58 may include any number of each functional type. However, in keeping with general CAP system designs which require each Elemental Processor, or cell, to be functionally identical, each of the composite Elemental Processors 60 must contain like numbers of each functional type of Module 58. Further, in order for the Array Processor 61 to operate as a SIMD machine, again in keeping with general CAP system designs, the Modules 58 architecturally present on each array level should be of the same functional type. Thus, each module array forms a functional plane, such as a memory plane or an accumulator plane, that lies transverse to the Elemental Processors 60 within the Array Processor 61. In addition, the Modules 58 that form a given functional plane must be operatively connected in common for control purposes so as to always simultaneously execute a common logical function, thereby inherently establishing the SIMD operation of the Array Processor 61.

Figure 5A:
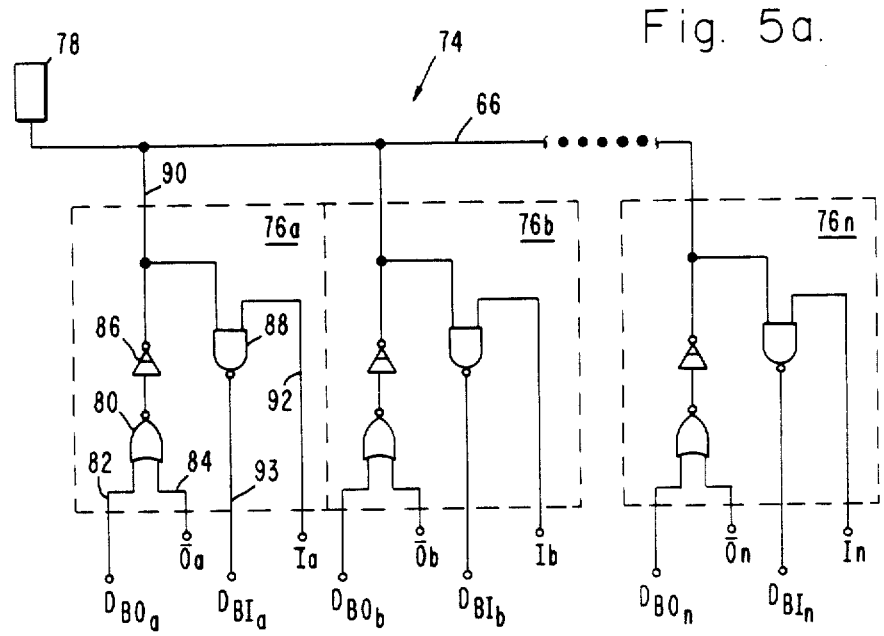
FIG. 5a is a schematic circuit diagram of the data exchange subsystem which includes a data bus and its associated interface logic for commonly interconnecting a number of modules so as to form an elemental processor such as that shown in FIG. 4.

As previously mentioned, the Modules 58 present in a composite Elemental Processor 60 are principally interconnected for the purpose of intermodule transfer of data by a Data Exchange Subsystem, such as the one shown in FIG. 5a. This subsystem is comprised of a Data Bus 66 and a plurality of essentially identical Data Bus Interface Circuits 76a-n, each being present in a respective Module 58 of the composite elemental processor 60. The Bus Interfaces 76 are, in fact, integral sections of their corresponding input-programmable logic circuits.

The Data Bus 66 is a common interconnection between all of the Bus Interfaces 76 that are present in the Modules 58 of a composite Elemental Processor 60. This commonality allows any number of Modules 58 to be incorporated into an Elemental Processor 60, with each effectively being architecturally (and electrically) equidistant from the other. Thus, the Elemental Processors 60 may be optimally configured for either a particular or a general application by the incorporation of an appropriate number of each functional type of Module 58 therein.

The Data Exchange Subsystem 74 allows for the transfer of serial data between any number of Modules 58 within the composite Elemental Processor 60. To provide serial data on the common Data Bus 66, at least one Bus Interface 76 must be configured to transmit data as it is serially shifted from its respective memory register onto the Data Bus 66. Considering the case where two or more Modules 58 are configured to serially transmit their respective and typically different data, the subsystem effectively functions to logically AND the data together. It thereby resolves any bit-conflict in the respective serial data by forcing the transmission of a logical 0 onto the Data Bus 66 at that time. In order for data to be received by one or more Modules 58, their respective Bus Interfaces 76 must be configured to transfer serial data from the data bus to their respective input-programmable logic circuits. The data may then be serially shifted into its respective memory register or operated on by the input-programmable logic circuit with the product therefrom then being shifted into the memory register. Thus, in the case of two or more Modules 58 receiving data simultaneously, the data is either simply copied into a number of memory registers or logically operated on consistent with any of the module function types present in the composite Elemental Processor 60, or both. Finally, the Modules 58 not configured for either transmitting or receiving data must be effectively, or functionally, disconnected from the Data Bus 66. This is accomplished by configuring their Bus Interfaces 76 to continuously transmit a logical 1 onto the bus 66. This allows the subsystem, by virtue of its data conflict resolving ability, to effectively ignore those Modules 58 not actively transmitting or receiving data. Thus, inactive Modules 58 are electrically, but not functionally connected to their respective Data Busses 66.

Figure 2:
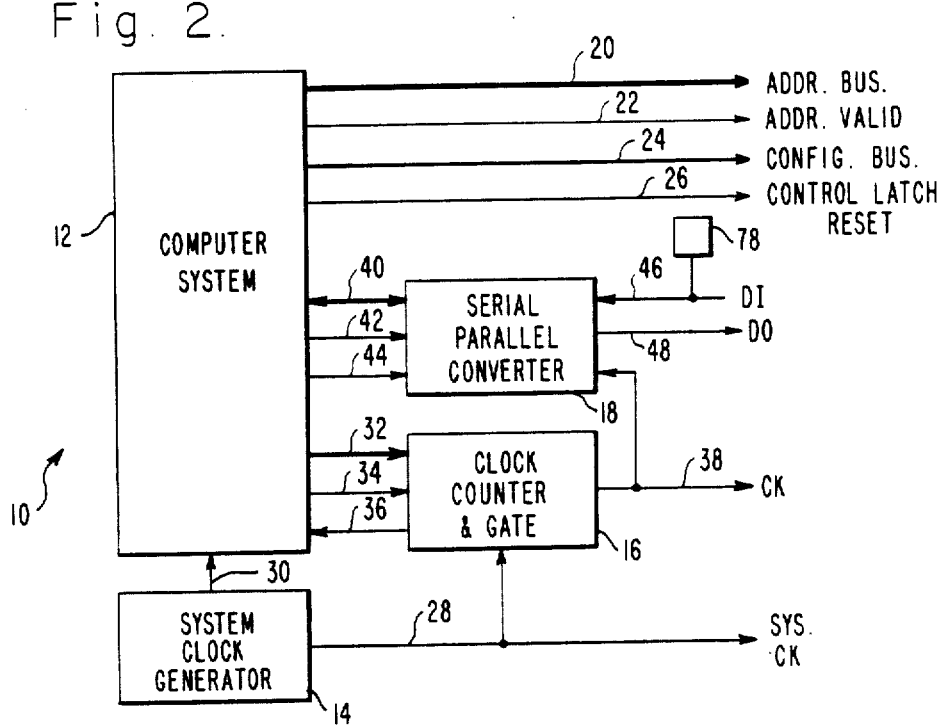
FIG. 2 is a schematic block diagram of a control processor suitable for directing the operation of the array processor.

The Control Processor 10, shown in FIG. 2, is operatively connected to the Modules 58 of the Array Processor 61 by the Processor Interface 63, shown in FIG. 1. The Processor Interface 63 is comprised of a plurality of individual interface circuits 49, such as the one shown in FIG. 3. An Interface Circuit 49 is architecturally present on each array level and consists of an Address Decoder 50 and a Configuration Latch 52, the inputs of each being connected to the Control Processor 10 by an Address Bus 20 and a Control Bus 24, respectively. The outputs of the Configuration Latch 52 are, in turn, connected to the programmable inputs of the input-programmable logic circuits contained in the Modules 58 of its corresponding functional plane, i.e. present on its respective array level. More specifically, the corresponding programmable inputs of the logic circuits are respectively connected together, each then being connected to a separate output of the Configuration Latch 52 by means of the configuration Bus 56. Thus, the Control Processor 10 can selectively address and write a preselected control word into each of the Configuration Latches 52. Since each bit of a control word establishes the logic state of a common input of its corresponding input-programmable logic circuits, the control word effectively defines the functional configuration of all of the Modules 58 present in its respective functional plane. Consequently, the Control Processor 10 is provided with a simple means of separately configuring each functional plane within the Array Processor 61.

The general operation of the Array Processor 61, as previously mentioned, is directed by the Control Processor 10, shown in FIG. 2. The Control Processor 10 includes a Computer System 12 of conventional design and is capable of providing for program storage and sequencing, data storage and I/O data buffering, and random access to the interface circuits 49 of the Array Processor Interface 63.

Figure 13:
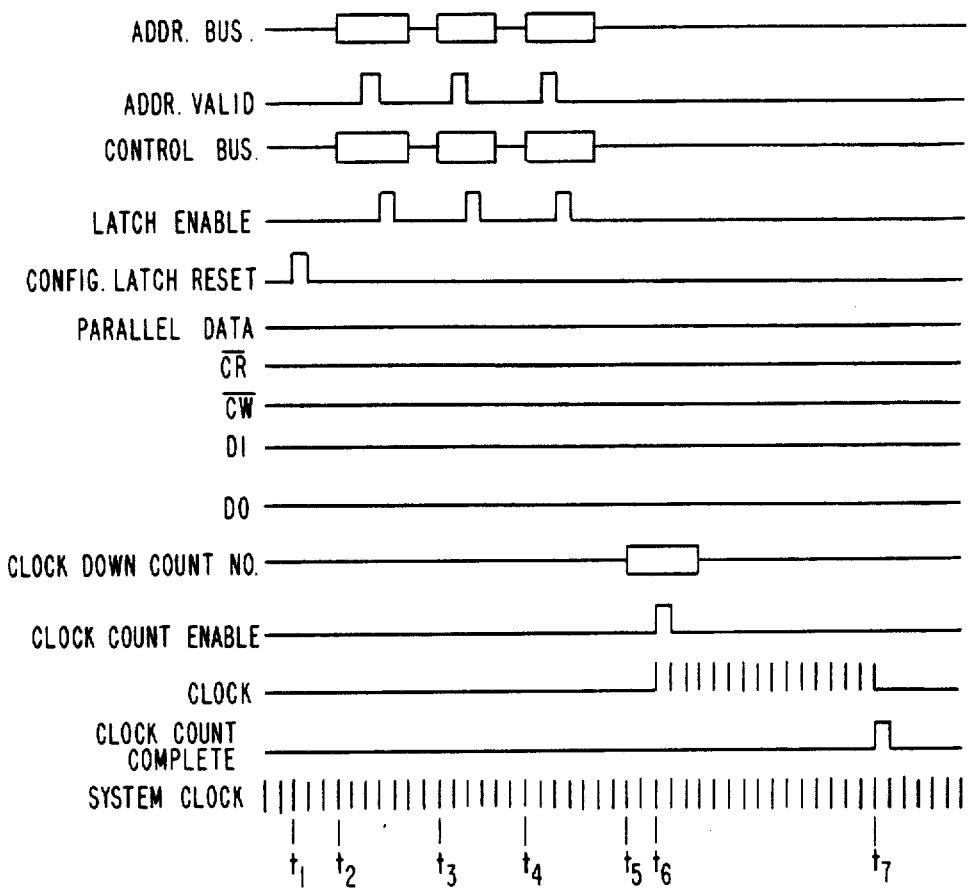
FIG. 13 is a schematic timing diagram for explaining the data level shift operation of the array processor according to the present invention.

The programs executed by the Control Processor 10 are naturally based on image processing algorithms. These algorithms are generally well-known in the art and can be used in conjunction with the Array Processor 61 to perform such tasks as signal analysis, involving Fourier transforms and matrix multiplication, and image analysis, involving contrast enhancement, edge definition, and object location. Each algorithm establishes a particular series of logical functions that must be performed on the image data set in order to extract the desired information. These logical functions can be conveniently performed by the Array Processor 61 by basically directing it to transfer a data set that has previously been mapped into the memory registers of one functional plane to those of another functional plane of the desired functional type. A succession of these data set transfers, or level shifts, even with a minimum of different functional types of Modules 58, can be used to implement practically any image processing algorithm. The particular steps necessary to perform a level shift are shown in FIG. 13 and will be discussed in greater detail below.

II. Detailed Description of the Modular Array Processor

A. The Control Processor

A Control Processor System 10, such as the one shown in FIG. 2, is required to direct the operation of the Array Processor 61. It necessarily includes a digital computer system 12 of conventional design, such as a high speed, bit-slice system as typified by an Advanced Micro Devices AMD2901 microprocessor based system. It should be understood, however, that the present invention is not directed to the design of the Control Processor 10, but rather at a complete array processor system that includes a Control Processor. Thus, the Control Processor's necessary capabilities, and general means for providing them, are described below only for purposes of completeness.

The Control Processor 10 must be capable of supplying all of the signals necessary to interface with the Array Processor Interface 63 for purposes of controlling the Array Processor 61. Accordingly, the Control Processor 10 must be capable of providing an array level select address on the Address Bus 20 for randomly accessing the interface circuits 49 of the Processor Interface 63. The number of parallel lines in the Address Bus 20 is preferably ten, or at least the logarithm to the base 2 of the number of array levels that may be randomly selected. The Control Processor must be capable of providing a control word of 16 bits in length on the Control Bus 24, there being preferably 16 parallel lines therein. In conjunction with the address and control word, the Control Processor 10 must provide an Address Valid signal on the Address Valid line 22 for indicating that the address and its corresponding control word are stable on their respective busses. Finally, it must be capable of providing a Configuration Latch Reset signal on the Reset line 26 for resetting the bits of all of the configuration latches present in the Processor Interface 63 to their inactive states.

The Control Processor 10 must also be capable of providing a stable, high speed (preferably around 10 MHz) System Clock Signal (SYS CK). A standard clock generator 14 can be used to provide the necessary SYS CK signal on the System Clock line 28. It may also provide a signal on line 30 to ultimately synchronize the computer system 12 with the Array Processor 61.

The Control Processor 10 must further be capable of gating a preselected number of clock pulses derived from SYS CK onto the Array Processor Clock (CK) line 38. This may be accomplished through the use of a clock counter and gate 16 that includes a standard down counter circuit and an AND gate. A CK pulse count number is provided to the input latch of the clock counter and gate 16 by means of a unidirectional data bus 32. The operation of the clock counter and gate 16 is initiated by a Down-Count Enable signal on control line 34. In response, the Clock Counter and Gate 16 enables the transfer of SYS CK pulses onto the CK line 38 by means of the AND gate while counting down the preselected number of SYS CK pulses. At the completion of the down count, the clock counter and gate 16 disables the transfer of SYS CK pulses and provides the computer system 12 with a Down-Count Complete Signal on control line 36.

Finally, the Control Processor system 10 must also provide for the serial exchange of data (data I/O) with the Array Processor 61 on the Data In/Data Out lines 46, 48. This may be accomplished with the use of a standard serial-to-parallel and parallel-to-Serial Converter 18. Single data words from a two-dimensionally structured data set that has been temporarily stored in, or buffered by, the Computer System 12 may be transferred in parallel to the Converter 18 by means of the bidirectional Data Bus 40. There, each parallel data word, having a preferred word length of 16 bits, is serially transferred to the Array Processor 61 via the Data Out (DO) line 48. Conversely, a serial data word from a data set stored in the Array Processor 61 can be transferred to the Converter 18 via the Data In (DI) line 46. The data word is then converted to parallel and transferred to the Computer System 12 over the Data Bus 40.

Figure 3:
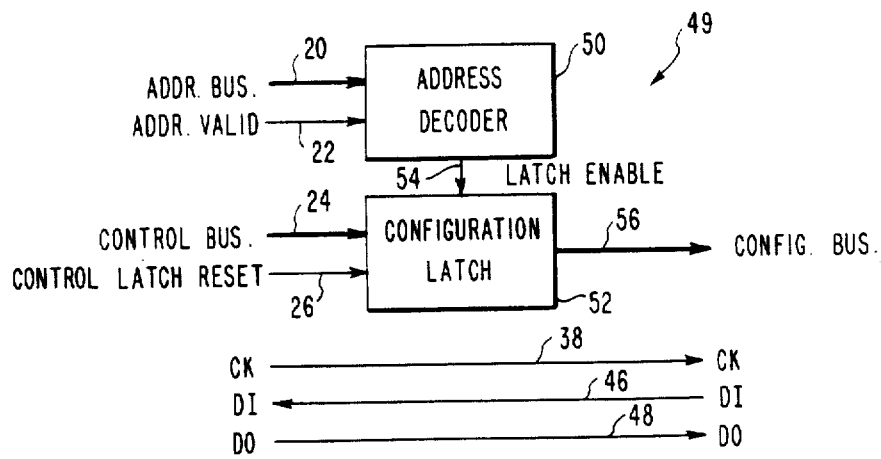
FIG. 3 is a schematic block diagram detail of the control processor/array processor interface.
Figure 4:
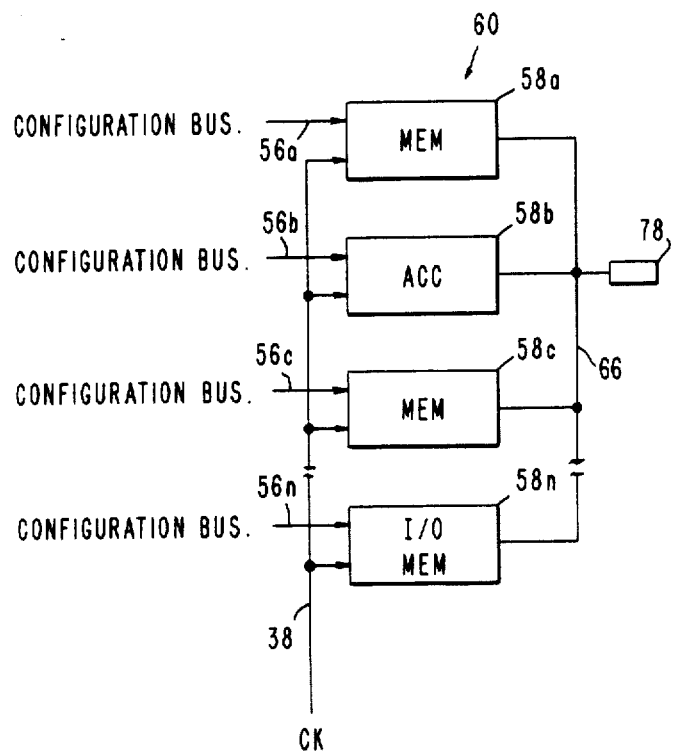
FIG. 4 is a schematic block diagram detail of an elemental processor used in the array processor of FIG. 1.

Control lines 42, 44 are provided by the Computer System 12 for respectively controlling the serial data in, parallel data word read operation and the parallel data word write, serial data out operation of the Converter 18. The serial/parallel conversion of data by the Converter 18 is in response to, and synchronous with, the CK pulses as provided by the Clock Counter and Gate 16 to the Converter 18 on the Clock Signal line 38. The CK pulses are also, simultaneously, provided to the Array Processor 61. Thus, the clock down-count number directly determines the word length of the data to be exchanged between the Control Processor 10 and the Array Processor 61. As shown in FIG. 3, the CK, DI and DO lines 38, 46, 48 are passed through each of the Interface Circuits 49 and made available to the functional planes on their corresponding array levels.

B. Array Processor

As previously explained, the Array Processor 61 is comprised of a plurality of Elemental Processors 60 which are, in turn, comprised of a plurality of Modules 58 of several different functional types. The Modules 58 are associated so that, conceptually, the Elemental Processors 60 are parallel, thereby providing for a parallel flow of data within the Array Processor 61. Since the Modules 58 of each Elemental Processor 60 are interconnected only by the single Data Bus 66 of their respective Data Exchange Subsystems, the data flow therein is accurately described as bit-serial. However, it can also be described as word-parallel, due to the common and simultaneous operation of the parallel Elemental Processors 60. This word-parallel, bit-serial operation allows the Array Processor 61 to effectively process an entire image at one time. Further, this type of operation allows the use of fairly simple serial arithmetic circuitry in the implementation of the logic circuits of the various functional types of modules.

In order to provide the common word-parallel, bit-serial mode of operation, the Modules 58 are further associated as functional planes transverse to the Elemental Processors 60, each plane being composed of a common funtional type of Module 58 present on an array level of the Array Processor 61. The several types of Modules 58 thereby provide for such functional planes as memory, accumulator, counter, and comparator.

C. Processor Interface

The Control Processor 10 is operatively associated with each of the functional planes by a respective one of the interface circuits 49 which, together, comprise the Processor Interface 63, shown in FIG. 1. Referring now to FIG. 3, each Interface Circuit 49 consists of a single, preferably 16 bit wide, word parallel data latch 52 and an associated Address Decoder 50. The Address and Address Valid inputs of the Address Decoder 50 and the Data and Latch Reset inputs of the Configuration Latch 52, along with the corresponding inputs of all of the interface circuits 49 of the Processor Interface 63, are respectively connected to the parallel lines of the Address Bus 20, the Address Valid line 22, the Control Bus 24 and the Configuration Latch Reset line 26. Each Address Decoder 50 is also operatively connected to its respective Configuration Latch 52 by a latch enable line 54. The data outputs of the Configuration Latches 52 as thereby provided from a plurality of configuration buses 56 that are each operatively associated with a separate functional plane of the Array Processor 61.

Considering now the operation of the Processor Interface 63, each Address Decoder 50 present therein is responsive to a particular array level select address that is provided by the Control Processor 10 on the Address Bus 20. Thus, the operation of a particular Interface Circuit 49 is initiated when the Address Decoder 50 coder 50" detects its corresponding address on the Address Bus 20 in the presence of the Address Valid signal on the Address Valid line 22. The Address Decoder 50, at that point, generates a latch enable signal on the latch enable line 54. In response, the Configuration Latch 52 latches in the control word as provided by the Control Processor 10 in conjunction with the array level select address and, therefore, currently present on the Control Bus 24. Once latched, the respective bits of the control word directly establish the logic states of the signals present on the separate parallel lines of the Configuration Bus 56. The control word, as present in the Latch 52, remains stable until either a new control word is addressed to the Latch 52 or a Configuration Latch Reset signal is received on the Reset line 26.

D. Memory Functional Plane

Figure 6:
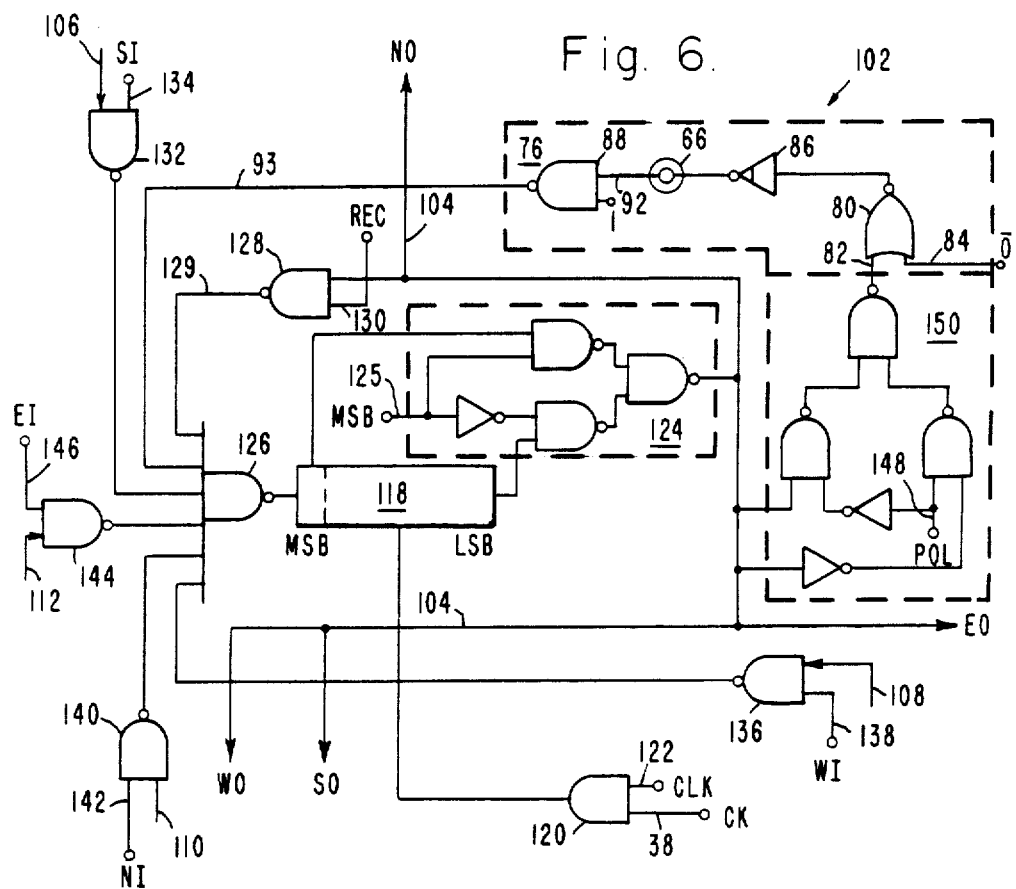
FIG. 6 is a schematic block and circuit diagram of the memory register and input programmable logic circuit of the memory functional type of module according to the present invention.

In accordance with the present invention, the functional type of a particular Module 58, as well as its corresponding functional plane, is determined by the particular design of its input-programmable logic circuit. A number of these logic circuits, each in accordance with the present invention, are described in this section and Sections E, F, G, and H, infra. A memory type input-programmable logic circuit is shown in FIG. 6. The various programmable inputs are listed along with their functional definition in Table I.

The Memory Module is designed to have two major functions. The first is to provide for the storage of a single data word from a two-dimensionally structured data set. This allows an entire image to be mapped directly into a Memory Functional Plane, thereby inherently preserving the spatial interrelationship of its constituent data words. The second function is to provide for the lateral transfer of its data word to the corresponding Memory Module of an adjacent Elemental Processor, i.e., to one of the four nearest neighboring modules within its functional plane. This function, when considered in terms of the entire Memory Functional Plane, permits an entire image to be laterally shifted in any one of the four orthogonal directions within the plane without loss of the image's spatial integrity. Accordingly, a Memory Logic Circuit capable of providing these functions is now described.

Figure 5B:
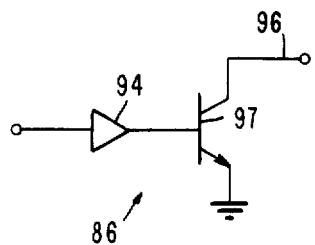
Figure 5C:
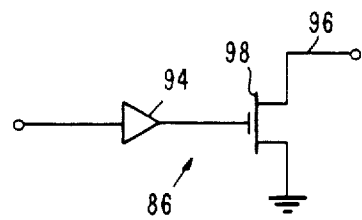

The central component of the Memory Logic Circuit 102, as shown in FIG. 6, is naturally a Memory Register 118, preferably having a length of 16 bits. The Clock Enable signal, when applied to the CLK programmable input of the AND gate 120, enables the application of a preselected number of clock pulses, as provided by the Control Processor 10 on the CK line 38, to the Memory Register 118.

the open collector output buffer 86 onto the data bus line 66 and thereby made available to the other Modules 58 of its respective Elemental Processor 60. It should be understood that either a standard open collector, grounded emitter bipolar output buffer, such as shown in FIG. 5b, or an open drain, grounded source FET output buffer such as shown in FIG. 5c, may be used, depending on the family of logic used, to implement the module logic circuits.

Data is also serially input into the Memory Register 118 through its MSB position when CK pulses are applied. This input data is provided by the multiple input NAND gate 126 as the product of data from a number of different sources. One such source is the data re-

TABLE I

| Bit | Mnemonic | Name | Active State | Function |
|---|---|---|---|---|
| Configuration Bus Inputs for Memory Functional Plane | | | | |
| 1 | I | Input | High | Enables data input through the Data Exchange Subsystem. |
| 2 | O | Output | Low | Enables data output through the Data Exchange Subsystem. |
| 3 | POL | Polarity | High | Inverts the data polarity as it is being transferred from the memory register to the Data Exchange Subsystem. |
| 4 | CLK | Clock Enable | High | Enables application of CK pulses to the shift register. |
| 5 | MSB | Most Significant Bit | High | Selects the transfer of the most significant bit of data in the memory register to the Data Exchange Subsystem. |
| | | | Low | Selects the serial transfer of data through the Least Significant Bit position of the memory register to the Data Exchange Subsystem. |
| 6 | REC | Recirculate | High | Enables the recirculation of data from the LSB to the MSB position of the memory register during shifting. |
| 7 | NI | North Data In Enable | High | Enables the reception of data from the south nearest neighboring Memory Module. |
| 8 | EI | East Data In Enable | High | Enables the reception of data from the west nearest neighboring Memory Module. |
| 9 | SI | South Data In Enable | High | Enables the reception of data from the north nearest neighboring Memory Module. |
| 10 | WI | West Data In Enable | High | Enables the reception of data from the east nearest neighboring Memory Module. |
| Additional Inputs and Outputs | | | | |
| | CK | Clock | Pulse | Shifts the data in the memory register one position to the right; edge sensitive, low when inactive. |

Each clock pulse applied causes the data contained in the Memory Register 118 to be shifted right by one bit, thereby providing for the serial transfer of data both to and from the Memory Register 118. Thus, when CK pulses are applied, serial data from the Most Significant Bit (MSB) or Least Significant Bit (LSB) of the Memory Register 118, depending on the logic state of the MSB programmable input 125, is transferred through the Data Selector Circuit 124 to the nearest neighbor output line 104. The serial data is thereby made available to each of the four nearest neighboring Memory Modules within its respective functional plane. The data on the nearest neighbor output line 104 is also provided to the Polarity Selection Circuit 150 wherein the polarity of the data is either inverted or noninverted according to the logic state of the POL programmable input 148. The data therefrom is then provided to the data transmitter section of the memory module's Data Bus Interface Circuit 76 via the data line 82. There, the data is combined with the Output Enable signal on the $\overline{O}$ programmable input line 84 by the NOR gate 80. This results in either the data or a logical 1 being buffered by ceiver section of the Data Bus Interface Circuit 76. There, a logical NAND gate 88 is used to combine the data Input Enable signal present on the I programmable input line 92 with the data present on the Data Bus 66. Either the serial data received or a logical 1 is thereby provided to the NAND gate 126 via its input line 93, depending on the logic state of the data Input Enable signal.

Another source of data is the Memory Register 118 itself. Data output from the register onto the Nearest Neighbor Data Output line 104 is combined with the Recirculation Enable signal as applied to the REC programmable input 130 of the NAND gate 128, thereby providing either the inverted data recirculated from the output of the Memory Register 118 or a logical 1 to the NAND gate 126 via its input line 129.

The remaining sources of data are the four nearest neighboring Memory Modules. In each case, the data present on the Nearest Neighbor Data Output lines 106, 108, 110, 112 are combined with their corresponding directional Input Enable signals on the SI, WI, NI, EI programmable inputs, 134, 138, 142, 146 of the logical NAND gates 132, 136, 140, 144, respectively. Either the inverted data from a nearest neighboring module or a logical 1 is thereby provided by each as an input to the NAND gate 126.

Figure 7:
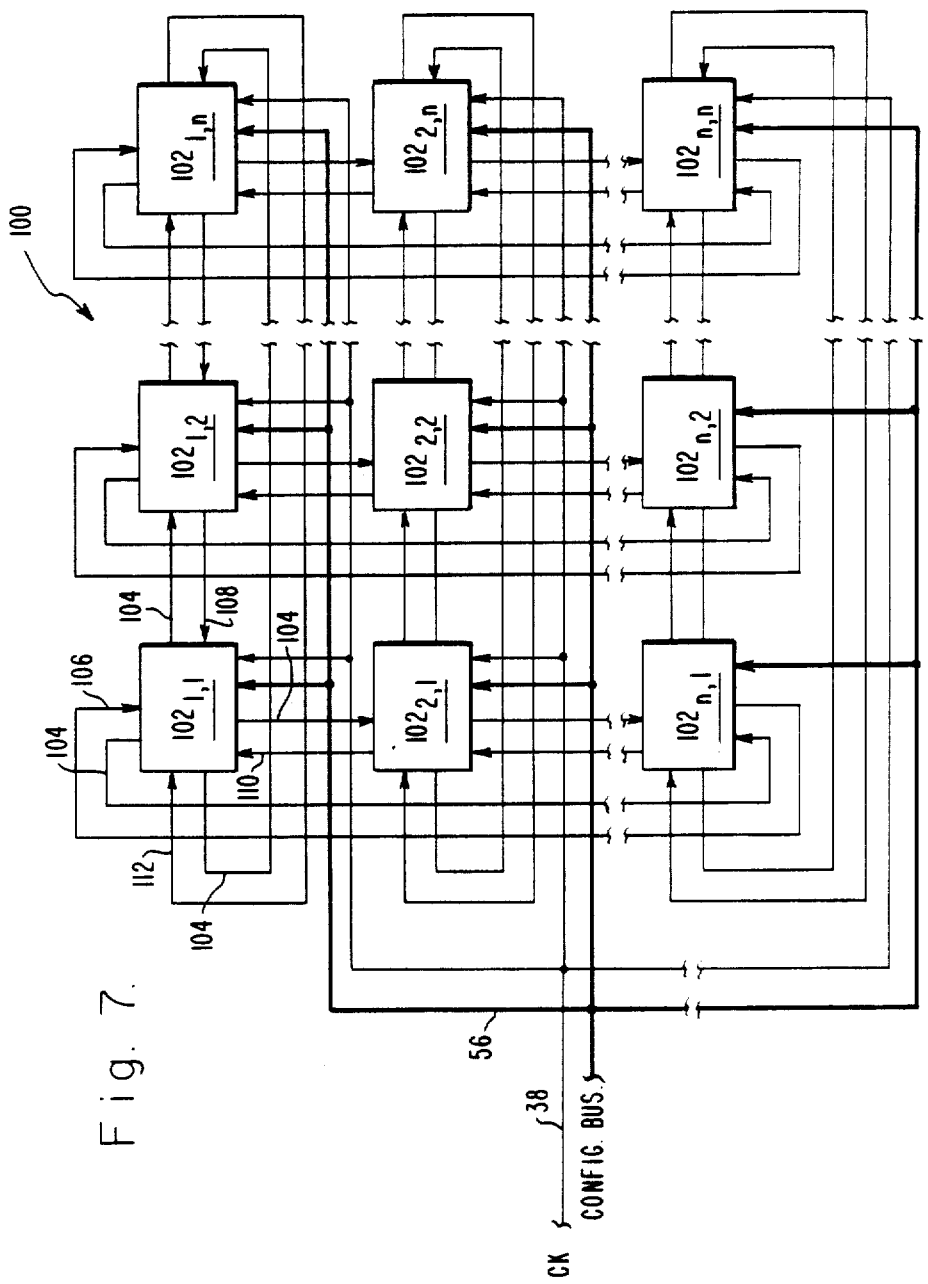
FIG. 7 is a schematic block diagram of a memory functional plane consisting of an array level of memory function modules.

A Memory Functional Plane 100, conceptually taken as a cross-section of the Array Processor 61 transverse to its Elemental Processors 60 is shown in FIG. 7. The Modules 58 containing the memory input-programmable logic circuits 102 are shown distributed as an N×N array. The logic circuits 102 of the Memory Functional Plane 100 are interconnected, for purposes of bidirectional serial data transfer, to each of their four nearest neighbors. Considering the corner module $102_{1,1}$ of the functional plane 100, it provides data to its neighboring modules, $102_{1,2}$, $102_{1,n}$, and $102_{n,1}$, by means of the Nearest Neighbor Data Output line 104. The corner module $102_{1,1}$ also receives data from each of its nearest neighboring modules by means of their respective Nearest Neighbor Data Output lines 108, 112, 110, 106. Thus, as can be seen, the nearest neighbor interconnections wrap around the module array of the Memory Functional Plane 100 so that no data is lost at any edge boundary of the N×N array.

For purposes of control, the modules 102 are commonly connected to the configuration Bus 56 of the Interface Circuit 49 corresponding to the Memory Functional Plane 100. The programmable inputs of each of the module input-programmable logic circuits 102 are connected so that each of the parallel lines of the Bus 56 is commonly connected to all of the programmable inputs of a given type. Thus, all of the module input-programmable logic circuits 102 present in the Memory Functional Plane 100 are always operatively configured identical to one another, since the logic states of their programmable inputs are commonly established by the control word present in the data latch 52 of its corresponding processor Interface Circuit 49.

Finally, the clock pulses generated by the Clock Counter and Gate 16 of the Control Processor 10 are commonly provided to the input-programmable logic circuits by means of the clock line 38.

E. I/O Functional Plane

Figure 8:
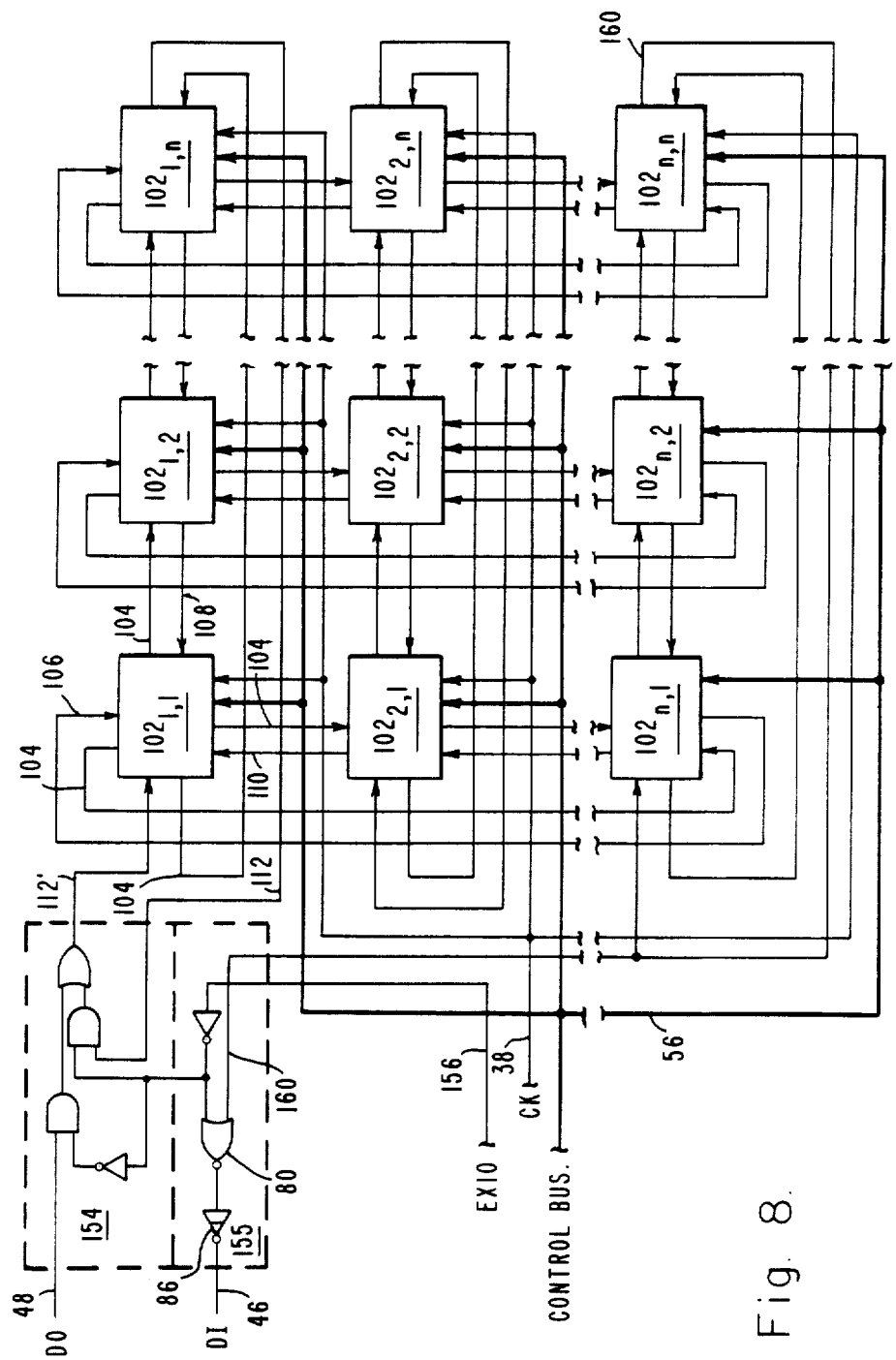
FIG. 8 is a schematic block and circuit diagram of the memory functional plane, as shown in FIG. 7, modified to permit serial input/output data exchange with the control processor system.

The I/O function plane 152, as shown in FIG. 8, is essentially a Memory Functional Plane that has been modified to permit the serial exchange of data with the Control Processor 10. Table II provides a listing and functional description of the various inputs and outputs required by the I/O Functional Plane.

The I/O Functional Plane 152 is substantially identical to the Memory Functional Plane 100. They differ, however, in that the I/O Functional Plane 152 includes a serial Data Receiver/Selector 154 for selecting between data provided by the Control Processor 10 on the DO line 48 and the data provided by the neighboring Memory Module $102_{1,n}$ on its Nearest Neighbor Data Out line 112. The data from either source is provided to the Memory Logic Circuit $102_{1,1}$ on its East Data in line 112'. The selection between these two sources of data depends on the External I/O signal present on the EXIO programmable input 156. The I/O Functional Plane 152 also includes the serial Data Transmitter Circuit 155. This circuit is functionally identical to the data transmitting portion of the Bus Interface Circuit 76. The Nearest Neighbor Data Out line 160 of the Memory Logic Circuit $102_{n,n}$ provides data to the Data Transmitter Circuit 155. This data is combined with the External I/O signal on the EXIO programmable input line 156 by a NOR gate 80 and buffered onto the DI line 46 by the Open Collector Buffer Circuit 86. Similar to the operation of the Data Bus Interface Circuits 76, either the data present on the Nearest Neighbor Data Out line 160 or a logical 1 is transmitted, the selection depending on the logic state of the EXIO signal. Thus, when the EXIO signal on its programmable input 156 is a logical 0, the Data Receiver/Selector circuit 154 provides the top row, corner Memory Logic Circuit $102_{1,1}$ with data from the Nearest Neighbor Data Out line 112 while the Data Transmitter Circuit 155 transmits a logical 1 onto the DI line 46. In this configuration, the I/O Functional Plane 152 is operatively identical to the Memory Functional Plane 100. In the converse configuration, when the EXIO signal is a logical 1, the data receiver/selector 154 provides the top row, corner Memory Logic Circuit $102_{1,1}$ with data derived from the Control Processor 10 via the DO line 48, while the Data Transmitter Circuit 155 serially transmits data from the Nearest Neighbor Data Out line 160 of the bottom row, corner Memory Logic Circuit $102_{n,n}$ to the Control Processor 10 via the DI line 46.

F. Accumulator Functional Plane

Figure 9:
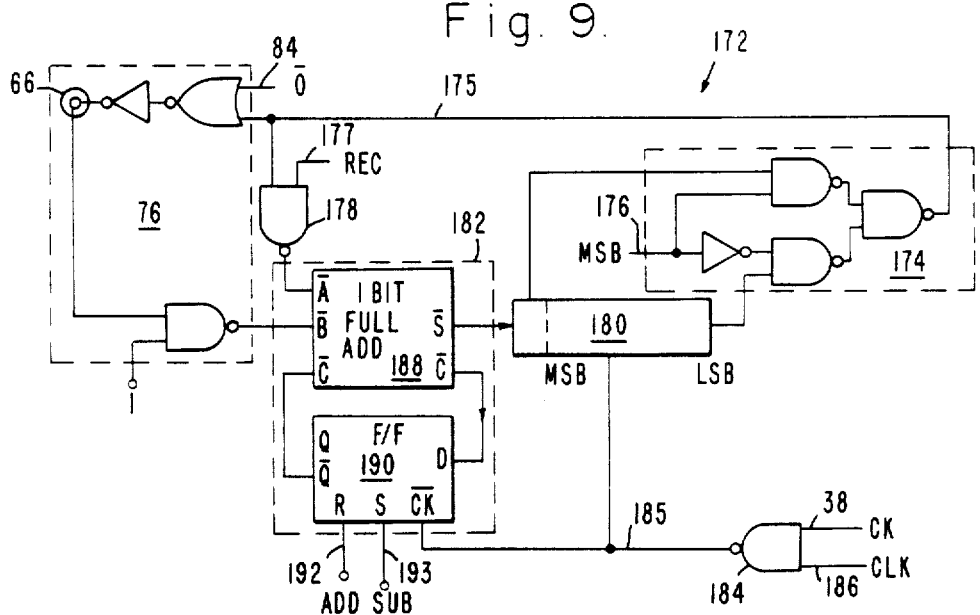
FIG. 9 is a schematic block and circuit diagram of an accumulator functional type of module according to the present invention.

The Modules 58 of an Accumulator Functional Plane each contain an accumulator type input-programmable logic circuit 172, as shown in FIG. 9. Table III provides a listing and functional description of each of the programmable inputs of the Accumulator Logic Circuit 172 and, equally, of an accumulator functional plane.

The accumulator module is designed to serially sum two data words and store the result. Thus, as shown in FIG. 9, the Accumulator Logic Circuit 172 substantially consists of a Memory Register 180, preferably 16 bits in length, and a 1-Bit Full Adder with Carry circuit 182. As in the Memory Logic Circuit 102, a NAND gate 184 is used to combine the clock pulses generated by the Clock Counter and Gate 16 as provided on the CK line 38 with the Clock Enable signal on the CLK programmable input 186, thereby allowing the selective application of the clock pulses to the Memory Register 180. Upon application of each clock pulse, the Memory Register 180 acts as a serial shift register, shifting the data contained therein 1 bit to the right. Data is output from the Memory Register 180 through the Data Selector Circuit 174 to the Data Bus Interface Circuit 76. The Data Selector Circuit 174 is of conventional design and selectively transfers output data from either the Most Significant Bit or Least Significant Bit of the Memory Register 180 to its data output line 175 depending on the logic state of the Most Significant Bit signal on the MSB proprammable input line 176.

TABLE II

| Bit | Mnemonic | Name | Active State | Function |
|---|---|---|---|---|
| | | | Configuration Bus Inputs for I/O Functional Plane | |
| 1 | I | Input | High | Enables data input through the Data Exchange Subsystem. |
| 2 | O | Output | Low | Enables data output through the Data Exchange Subsystem. |
| 3 | POL | Polarity | High | Inverts the data polarity as it is |

TABLE II-continued

| Bit | Mnemonic | Name | Active State | Function |
|-----|----------|------|--------------|----------|
|     |          |      |              | being transferred from the memory register to the Data Exchange Subsystem. |
| 4   | CLK      | Clock Enable | High | Enables application of CK pulses to the shift register. |
| 5   | MSB      | Most Significant Bit | High | Selects the transfer of the most significant bit of data in the memory register to the Data Exchange Subsystem. |
|     |          |      | Low | Selects the serial transfer of data through the Least Significant Bit position of the memory register to the Data Exchange Subsystem. |
| 6   | REC      | Recirculate | High | Enables the recirculation of data from the LSB to the MSHB position of the memory register during shifting. |
| 7   | NI       | North Data In Enable | High | Enables the reception of data from the south nearest neighboring Memory Module. |
| 8   | EI       | East Data In Enable | High | Enables the reception of data from the west nearest neighboring Memory Module. |
| 9   | SI       | South Data In Enable | High | Enables the reception of data from the north nearest neighboring Memory Module. |
| 10  | WI       | West Data In Enable | High | Enables the reception of data from the east nearest neighboring Memory Module. |
| 11  | EXIO     | External I/O Enable | High | Enables the bidirectional serial transfer of data between the Memory Module array and the Control Processor across the DI/DO bus lines. |
| Additional Inputs and Outputs | | | | |
|     | CK       | Clock | Pulse | Shifts the data in the memory register one position to the right; edge sensitive, low when inactive. |
|     | DI       | Data In | N/A | Unidirectional serial data bus for transfering data from the Array Processor to the Control Processor. |
|     | DO       | Data Out | N/A | Unidirectional serial data bus for the transfer of data from the Control Processor to the Array Processor. |

The transmission of data present on the data selector output line 175 onto the Data Bus 66 is dependent on the output signal present on the Bus Interface Circuit's $\overline{O}$ programmable input 84. The data may also be recirculated through the recirculation NAND gate 178 and ultimately to the Memory Register 180 depending on the logic state of the Recirculate signal present on the REC programmable input 177. The 1-Bit Full Adder with Carry preferably consists of a 1-bit full adder 188 and an appropriately connected Flip-flop 190, acting as a 1-bit carry latch. The 1-Bit Full Adder with Carry 182 receives either, or both, data being recirculated to the Memory Register 180 and input data from the data bus line 66, as provided by the Bus Interface 76. The sum or difference of this data, depending on whether the ADD or SUB signal is present on their respective programmable inputs 192, 193 prior to the accumulation of data and whether the input data is true or inverted, respectively, is synchronously clocked out of the 1-Bit Full Adder with Carry 182 and into the Memory Register 180.

It should thus be apparent then that a two-step procedure is necessary to sum two data words. The first step is to serially sum a first data word into the Memory Register 180 from the Bus Interface 76. This is done with the recirculation of the data previously present in the Memory Register 180 disabled. Next, a second data word is serially input from the Bus Interface 76. At the same time, the first data word is recirculated from the Memory Register 180, both data words being synchronously applied to the 1-Bit Full Adder with Carry 182.

TABLE III

| Bit | Mnemonic | Name | Active State | Function |
|-----|----------|------|--------------|----------|
| Configuration Bus Inputs for Accumulator Functional Plane | | | | |
| 1   | I        | Input | High | Enables data input through the Data Exchange Subsystem. |
| 2   | $\overline{O}$ | Output | Low | Enables data output through the Data Exchange Subsystem. |
| 3   | CLK      | Clock Enable | High | Enables application of CK pulses to the shift register. |
| 4   | MSB      | Most Significant Bit | High | Selects the transfer of the most significant bit of data in the memory register to the Data Exchange Subsystem. |
|     |          |      | Low | Selects the transfer of the Least Significant Bit of data in the memory register to be transferred to the Data Exchange Subsystem. |
| 5   | REC      | Recirculate | High | Enables the recirculation of the memory register data during shifting. |
| 6   | ADD      | Add | High | Resets the 1 bit full adder with carry. |

TABLE III-continued

| Bit | Mnemonic | Name | Active State | Function |
|---|---|---|---|---|
| 7 | SUB | Subtract | High | Presets the 1 bit full adder with carry. |
| | | | Additional Inputs and Outputs | |
| | CK | Clock | Pulse | Shifts the data in the memory register one position to the right; edge sensitive, low when inactive. |

The resulting serial sum is then shifted, also synchronously, into the Memory Register 180. This sum is then available to be summed with additional data words or to be serially transferred to another Module 58 within its respective Elemental Processor 60.

Figure 10:
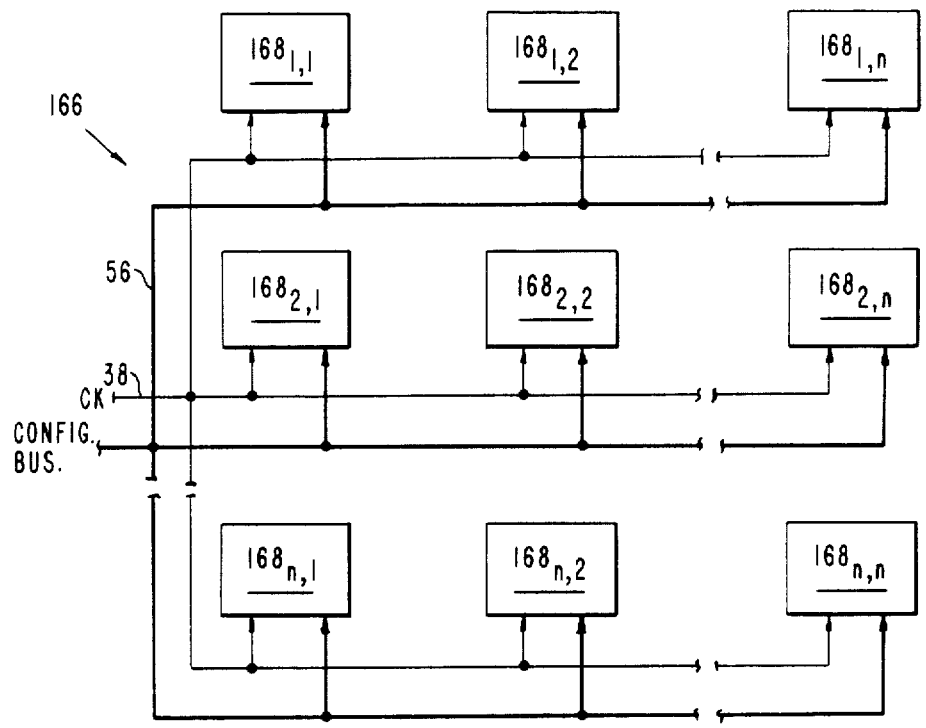
FIG. 10 is a schematic block diagram of an accumulator functional plane consisting of an array level of accumulator modules.

An Accumulator Functional Plane 166 consisting of an N×N array of Accumulator Modules 168, each containing an accumulator input-programmable logic circuit 172, is shown in FIG. 10. As in the memory and I/O Functional Planes, the Accumulator Modules 168 are commonly connected to their corresponding processor Interface Circuit 49 by means of a configuration Bus 56. Thus, the corresponding programmable inputs of the Accumulator Logic Circuits 172 are commonly connected together and further connected to the respective parallel lines of the configuration Bus 56. This allows the control word, as selected and written into the configuration latch 56 by the Control Processor 10, to commonly establish the logic state of each of the programmable inputs of the accumulator circuits 172. Thus, there is a common configuration of the Accumulator Logic Circuits 172 in the Accumulator Functional Plane 166 as directly selected by the Control Processor 10. The preselected number of clock pulses, as generated by the Clock Counter and Gate 16 of the Control Processor 10, are commonly provided to each of the Accumulator Modules 168 and the logic circuits 172 contained therein by the clock line 38.

G. Counter Functional Plane

Figure 11:
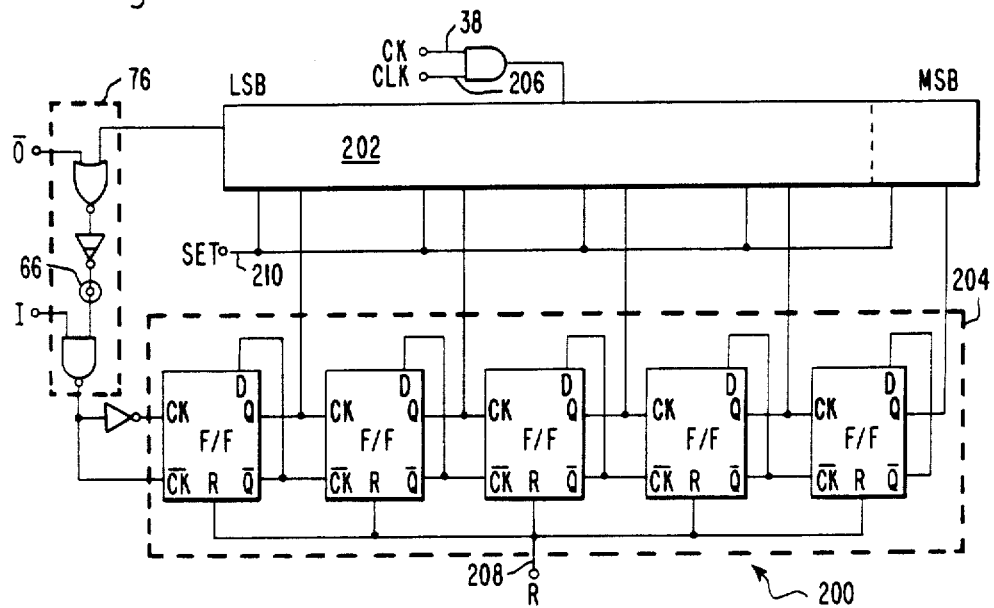
FIG. 11 is a schematic block and circuit diagram of the memory register and input programmable logic circuit of a counter functional type of module.

A counter input-programmable logic circuit is shown in FIG. 11. A listing and functional description of each of its programmable inputs and, therefore, of its corresponding Counter Functional Plane is provided in Table IV.

quent to the reception of each data bit from the Data Bus 66. Each logical 1 data bit received clocks the first stage of the binary counter 204 while the reception of a logical 0 has no effect on the binary counter. Thus, the binary counter 204 counts the number of logical 1 data bits sequentially present on the Data Bus 66, thereby functioning as a 1-bit full adder. This binary count, continuously available from the outputs of the binary counter 204, can be transferred in parallel to the parallel in, serial out Memory Register 202 by the application of the Parallel Data Set signal on the SET programmable input 210. The count may then be shifted out of the Memory Register 202, Least Significant Bit first, to the transmitter portion of the Bus Interface Circuit 76 in response to the application of clock pulses on the CK line 38, as enabled by the Clock Enable signal on the CLK programmable input 206. The binary counter 204 may be cleared at any time by the application of a reset signal on the R programmable input 208.

The interconnection, for control purposes, of Counter Logic Circuits 200 as a Counter Functional Plane is strictly analogous to the interconnection of the Accumulator Logic Circuits 172 in the accumulator function plane 166. The corresponding programmable inputs of the Counter Logic Circuits 200 are respectively connected together and further connected to the parallel lines of its corresponding configuration Bus 56. Thus, the operation of the Counter Logic Circuits 200 of a Counter Functional Plane is both common and synchronous.

H. Comparator Functional Plane

Figure 12:
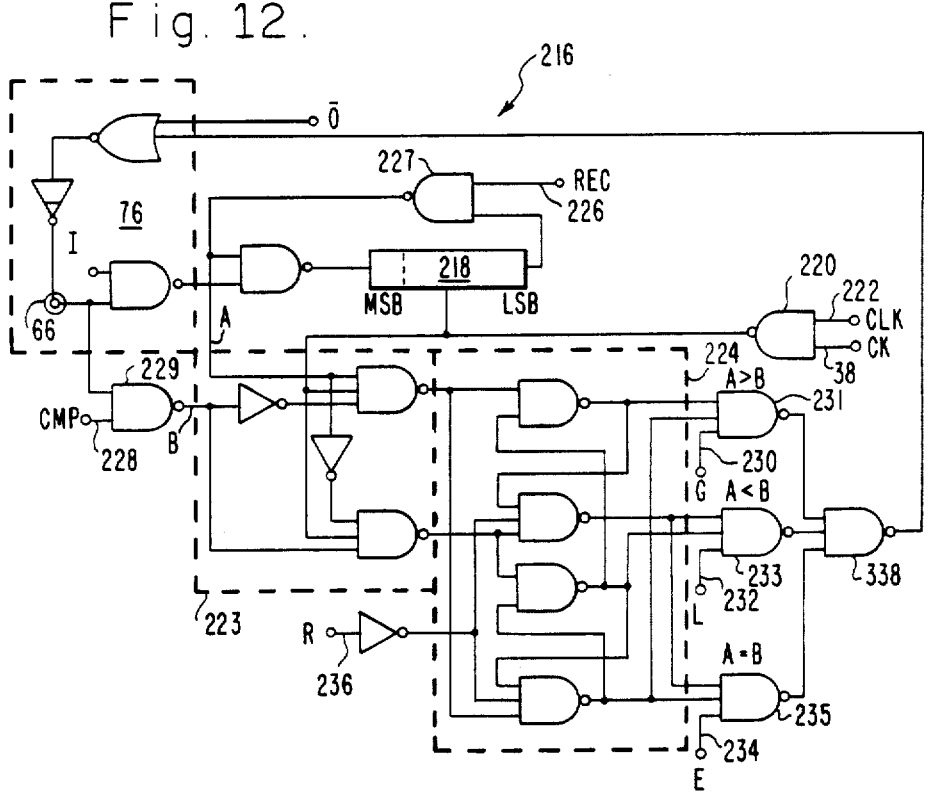
FIG. 12 is a schematic block and circuit diagram of the memory register and input programmable logic circuit of a comparator functional type of module.

A Comparator Input-Programmable Logic circuit 216 is shown in FIG. 12. Table V provides a listing and functional description of each of its programmable in-

TABLE IV

| Bit | Mnemonic | Name | Active State | Function |
|---|---|---|---|---|
| | | Configuration Bus Inputs for Counter Functional Plane | | |
| 1 | I | Input | High | Enables data input through the Data Exchange Subsystem. |
| 2 | $\overline{O}$ | Output | Low | Enables data output through the Data Exchange Subsystem. |
| 3 | CLK | Clock Enable | High | Enables application of CK pulses to the shift register. |
| 4 | SET | Parallel Data Set | High | Enables the parallel transfer of the bit count total to the shift register. |
| 5 | R | Reset | High | Resets the bit counter. |
| | | | Additional Inputs and Outputs | |
| | CK | Clock | Pulse | Shifts the data in the memory register one position to the right; edge sensitive, low when inactive. |

The Counter Logic Circuit 200 is designed to develop the bit-sum of data present on the Data Bus 66. Accordingly, the Counter Logic Circuit 200 is essentially comprised of a standard five stage binary counter 204 and a corresponding five bit Memory Register 202. In operation, data is received by the first stage of the binary counter 204 from the Data Bus 66 via the Bus Interface Circuit 76. The receiver section of the Bus Interface Circuit 76 is enabled prior and disabled subseputs and, equally, of its corresponding functional plane. The Comparator Logic Circuit 216 utilizes a three-step procedure to compare two data words. In the first step, a data word is received from the Data Bus 66 by the Bus Interface Circuit 76 and input into the Memory Register 218. This is done by serially shifting in the data word through the Most Significant Bit position of the Memory Register 218 in response to the application of clock pulses as provided via the NAND gate 220 by the Clock Enable signal on the CLK programmable input 222. This step is performed without providing for the recirculation of the data previously present in the Memory Register 218. That is, a logical zero is applied to the REC programmable input 226, thereby disabling the recirculation of data. The second step is the actual performance of the comparison of the data now present in the Memory Register 218 with a second data word serially provided to the logic circuit 216 over the Data Bus 66. The two data words are serially applied, least significant bit first, simultaneously to the respective inputs of the Comparator Subcircuit 223. The first data word is applied to the A input of the Comparator Subcircuit 223 by enabling the recirculation of the data word present in the memory register 218.

and E, respectively, that can be used to selectively test for any one, or combination of, Comparator State Output Latch conditions, such as A>B or A≧B. Thus, if the results of a comparison between two data words is such that the first is greater than the second, following the second step of the procedure, then the A>B output of the Comparator State Output Latch will be to a logical 1. Further, if the Greater Than and Equal To signals are applied to the G and E programmable inputs 230, 234, respectively, in the third step of the procedure, then the triple input NAND gate 238 will transfer a logical 1 to the Bus Interface Circuit 76, indicating that the result of the comparison was that the first data word was either greater than or equal to the second.

As with the Counter Functional Plane, the interconnection of the Comparator Logic Circuits 216 in the comparator functional plane, for control purposes, is

TABLE V

| Bit | Mnemonic | Name | Active State | Function |
|---|---|---|---|---|
| | | Configuration Bus Inputs for Comparator Functional Plane | | |
| 1 | I | Input | High | Enables data input through the Data Exchange Subsystem. |
| 2 | Ō | Output | Low | Enables data output through the Data Exchange Subsystem. |
| 3 | CLK | Clock Enable | High | Enables application of CK pulses to the shift register. |
| 4 | REC | Recirculate | High | Enables the recirculation of the memory register data during shifting. |
| 5 | R | Reset | High | Resets the Comparator State Output Latch. |
| 6 | CMP | Compare | High | Enables the transfer of serial data from the data bus to the Comparator Subcircuit. |
| 7 | G | Greater Than | High | Enables the output of the greater than comparator state latch. |
| 8 | L | Less Than | High | Enables the output of the less than comparator state latch. |
| 9 | E | Equal To | High | Enables the output of the equal to comparator state latch. |
| | | Additional Inputs and Outputs | | |
| | CK | Clock | Pulse | Shifts the data in the memory register one position to the right; edge sensitive, low when inactive. |

The second data word is transferred directly from the Data Bus 66 to the B input of the Comparator Subcircuit 223 by the Compare NAND Gate 229 which is enabled by the Compare Enable signal on its CMP programmable input 228. As the two data words are serially applied, the comparator subcircuit 223 compares their corresponding bits, the cumulative result of the comparisons being stored by the Comparator State Output Latch 224. That is, the Comparator State Output Latch 224 develops three outputs, Greater Than, Less Than and Equal To, that continuously reflect the state of the comparison of the two data words. The three outputs of the Comparator State Output Latch 224 are, as implied, latched, thereby retaining the state of the cumulative comparisons until reset by the application of a reset signal on the R programmable input 236. Naturally, the second, or serial comparison, step is finished when the Most Significant Bits of both data words have been compared. The third and final step of the comparison procedure is then to test for a particular comparison state on the outputs of the comparison state output Latch 224. In order to provide this, the outputs of the Latch 224 are respectively connected to three NAND gates 231, 233, 235. The outputs of the three NAND gates combined by means of the triple input NAND gate 338, with the output thereof being provided to the Bus Interface Circuit 76. Each of these gates 231, 233, 235 also has a programmable input, G, L strictly analogous to the interconnection of the Accumulator Logic Circuits 172 in the accumulator plane 166. The corresponding programmable inputs of the Comparator Logic Circuits 216 are respectively connected together and further connected to the parallel lines of their corresponding configuration Bus 56. Thus, the operation of the Comparator Logic Circuits 216 of a comparator functional plane is inherently both common and simultaneous.

I. Data Exchange Subsystem

As previously explained, the Data Exchange Subsystem, as shown in FIG. 5a, operates to permit any of the Modules 58 within its respective composite Elemental Processor 60 to synchronously either transmit data onto or receive data from the Data Bus 66. The Data Exchange Subsystem also provides for the functional disconnection of inactive modules from the Data Bus 66. In order to provide these functions, the Data Bus Subsystem 74 includes a Data Bus 66, a resistive load 78, a number of data receivers operatively connected to the Data Bus 66 for sensing the logic state of the data signal present thereon, and a number of data transmitters operatively connected to the Data Bus 66. In the case of the Data Exchange Subsystems used to interconnect the Modules 58 of the Elemental Processors 60, these data transmitters and receivers can be paired to form a plurality of identical Data Bus Interface Circuits 76a-n, each being present in a respective module of the composite Elemental Processor 60. The resistive load 78 is a resistor or, preferably, a resistively connected FET, that is connected between the electrically conductive bus line 66 and a voltage potential source (not shown), the voltage potential being sufficient to normally maintain the Data Bus 66 in a logical 1 state.

The preferred design of the Bus Interface Circuits 76, and therefore of the data transmitters and receivers, is described in conjunction with the memory input-programmable Logic Circuit 102, Section II D supra. Their essential features are as follows: (1) that the data output buffer 86 of the transmitter portion of the circuit 76 be of an open collector design, such as shown in FIGS. 5b-c; (2) that, when the Output Enable signal is applied to the $\overline{O}$ programmable input 84, data provided to the Bus Interface Circuit 76 on the data line 82 is transmitted onto the Data Bus 66; (3) that, when the Output Enable signal is withdrawn from the $\overline{O}$ programmable input 84, the Bus Interface Circuit generate and continuously transmit a logical 1 onto the Data Bus 66; and (4) that, when the Input Enable signal is applied to the I programmable input 92, data is received from the Data Bus 66 and made available on the data line 93. It should be apparent then that, when transmitting data, each Bus Interface Circuit 76 has the capability only to force the logic state of the Data Bus 66 to the logical zero state. Therefore, it is only when all of the Bus Interface Circuits 76a-n are transmitting a logical 1, either as data or to functionally disconnect their respective module from the Data Bus 66, that the logic state of the Data Bus 66 is a logical 1. Conversely, if any of the Bus Interface Circuits is transmitting a logical zero, the Data Bus 66 will be in a logical zero state. Thus, a Data Exchange Subsystem effectively provides the wired AND of all of the data being transmitted onto the Data Bus 66 to those Bus Interface Circuits 76 configured to receive data. Conflicts in the data being transmitted are, thereby resolved by the consistent application of a logical AND rule. The desirable consequence of this is that it permits data-dependent processing by the Array Processor 66 whenever data is being transferred between functional planes. That is, the conflict resolving capability of the Data Exchange Subsystems of the Array Processor 61 can be intentionally invoked by causing two or more images to be transferred between functional planes simultaneously. The data actually transmitted by each of the Data Exchange Subsystems is naturally dependent on the respective data contained in the transmitting Modules 58 of each Elemental Processor 60. Consequently, the Array Processdor 61 is capable of performing data dependent, or masking, operations wherein the resultant image is directly dependent on the respective data present in two or more images. This feature will be explained further by example in Section III(E) infra.

The common usage of the Bus Interface 76 to connect the input-programmable logic circuits to their respective Data Busses 66 substantially reduces the overall complexity of the Elemental Processors 60 and, therefore of the entire Array Processor 61. It permits the logic circuits to be designed and implemented substantially, if not totally independent of one another; the design being constrained only to the requirements of input programmability, the use of bit-serial arithmetic and data manipulation, and the utilization of a Bus Interface 76. By providing for the common interconnection of an Elemental Processor's modules (which correspond to the highly interconnected subcomponents of the prior art's "cell" Elemental Processors) via a single Data Bus 66, the architecture of the Elemental Processors 60 is simplified.

The Data Exchange Subsystem also simplifies the alteration or extension of the architecture of the Elemental Processors 60. Since each Module 58 connects to its respective Data Bus 66 via a single data line 90 that is common to both the data transmitter and receiver of its Bus Interface 76, Modules 58 can be either added or removed from an Elemental Processor by appropriately connecting or disconnecting their data lines 90 from the Data Bus 66. Further, the architecture may be extended without any direct effect on the optimization or speed of the Elemental Processor. It is only the practical limitation of signal propagation delays along the length of the bus line 66 that limits the number of Modules 58 that may be present in a composite Elemental Processor 60.

The Data Exchange Subsystem, however, is not limited to being used only to interconnect the Modules 58 of the Elemental Processors 60. It may be advantageously used anywhere serial data must be exchanged between a number of logic circuits via a bus line. For example, a functionally equivalent Data Exchange Subsystem is utilized to interconnect the Parallel/Serial Converter 18 of the Control Processor 10 with all of the I/O Functional Planes of the Array Processor 61. A resistive load 78, as shown in FIG. 2, is connected to, and normally maintains, the DI data bus 46 in a logical 1 state. The output buffer 86 of the data transmitters 155 present on each I/O Functional Plane (see FIG. 8) for driving data onto the DI data bus 46 is intentionally of an open collector design. Further, the disabled state of the data transmitters 155 is such that they continuously drive a logical one onto the DI data bus 46. Naturally, the data receiver of the I/O Data Exchange Subsystem is the Serial/Parallel Converter 18, the receiving of data being enabled by the clock pulses as provided on the CK line 38. Thus, all of the I/O Functional Planes are commonly connected to the Converter 18 of the Control Processor 10 by an I/O Data Exchange Subsystem.

It should also be understood that Data Exchange Subsystems could easily be operated in parallel in order to transfer parallel data words.

III. OPERATION

A. Level Shift

As previously mentioned, the principal operation of the Array Processor 61 in the processing of an image is to consecutively shift the image's constituent data words in parallel through a succession of functional planes. These level shifts can be utilized to implement the particular steps of a desired image processing algorithm by shifting the image data set, along with ancillary or image derivative data sets, through a succession of functional planes of appropriate types.

The particular steps necessary to perform a level shift involving a number of functional planes are shown in the system timing diagram of FIG. 13. At $t_1$, the Control Processor 10 issues a Configuration Latch Reset signal to the Processor Interface 63 via the Latch Reset line 26. This signal resets the data bits in all of the Configuration Latches 52 to the inactive state of their corresponding programmable inputs. Next, the Control Processor 10 successively addresses any number of the interface circuits 49 of the Processor Interface 63, writing a control word into each of their Configuration Latches 52. Naturally, each of these control words is functionally defined only in terms of the functional plane corresponding to the Interface Circuit 49 to which they are addressed. The control word for configuring a functional plane to perform a particular function can be determined by resort to the Tables I-V. For example, to configure a memory functional plane for a level shift of the data contained in its memory registers, while preserving the data via recirculation within each module, reference is made to Table I to develop the desired control word as shown in Table VI. Referring now to FIG. 13, the Control Processor 10 configures three functional planes at t2, t3, and t4, respectively. As previously explained, as the Address Decoder 50 of each Interface Circuit 49 is addressed, a latch enable signal is generated that, in turn, causes its corresponding Configuration Latch 52 to latch-in a control word. This may be referred to as a configuration cycle. Once the configuration cycles for the functional planes that are to be active during the level shift are executed, the remaining functional planes within the Array Processor 61 being left unconfigured and therefore inactive, the Control Processor 10 issues, at t5, the clock down-count number to the Clock Counter and Gate 16. The down-count number is latched into the Clock Counter and Gate 16 by the clock count enable signal at t6. This signal also initiates the down-count sequence to provide the preselected number of clock pulses, as specified by the down-count number, onto the CK line 38. In response to each of these clock pulses, the active functional planes either transmit or receive, depending on their configuration, a single data bit via their Data Exchange Subsystems.

TABLE VI

| CONTROL WORD | BIT FUNCTION |
|---|---|
| (MSB) 0000 0000 00 1 0 1 0 0 0 (LSB) | |
| — | (1) Input disabled |
| —— | (2) Output Enabled |
| ——— | (3) Polarity non-inverted |
| ————— | (4) Clock Enabled |
| —————— | (5) LSB selected |
| ——————— | (6) Recirculation enabled |
| ———————— (7–10) | Nearest Neighbor Data In disabled |
| ————————— (11–16) Unused | |

Thus, as is shown in FIG. 13, an entire image consisting of data words 16 bits in length can be level shifted between functional planes by the provision of a clock down-count number equal to 16. At t7, the down-count sequence ends and the Clock Counter and Gate 16 generates and provides a clock count complete signal to the Computer System 12, thus indicating that the level shift operation is complete.

B. Lateral Shift

Another basic operation of the Array Processor 61 is the array lateral shift. Though it is a basic operation, it is limited only to those functional planes provided with nearest neighbor serial data transfer capabilities, such as the memory and I/O Functional Planes. During the lateral shift operation, the image present in one of these functional planes is laterally shifted in any one of the four orthogonal directions within its functional plane without loss of the image's spatial integrity. The image's integrity is preserved by virtue of the wrap-around nearest neighbor interconnections between the modules located on the north and south and the east and west edges of the $N \times N$ module array. This allows data figuratively shifted over the edge of the array to reappear at its corresponding opposite edge. Further, since images are each present in a different functional plane, any number of images can be laterally shifted in totally independent directions simultaneously.

Figure 14:
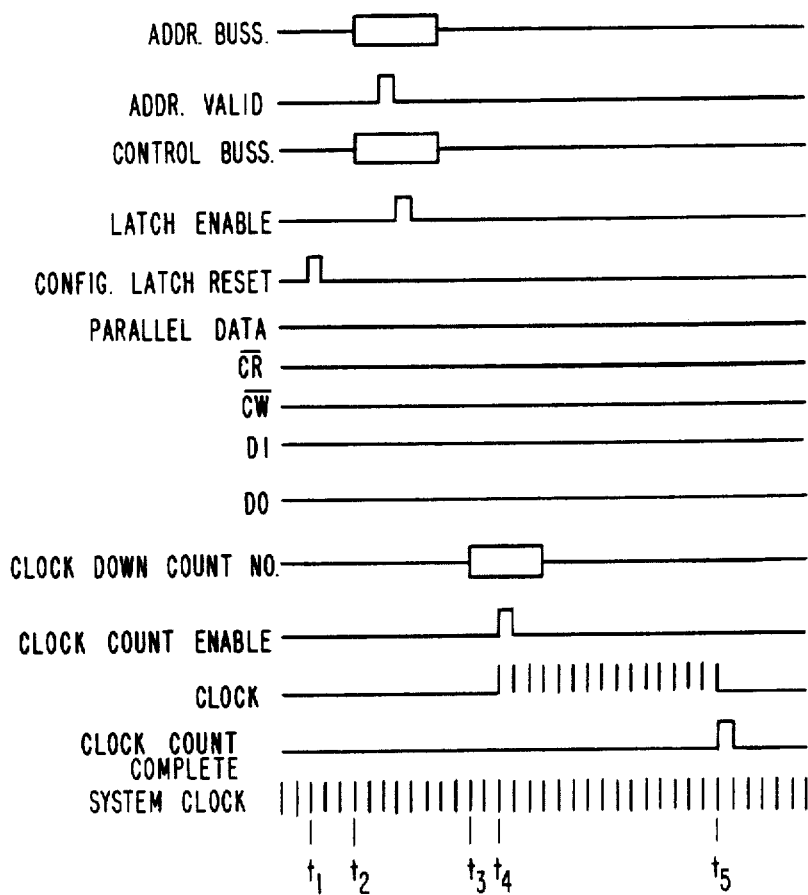
FIG. 14 is a schematic timing diagram for explaining the data lateral shift operation of the memory functional plane of FIG. 7.

The state timing diagram of FIG. 14 shows the particular steps necessary to perform a lateral shift operation. As in the level shift operation, the lateral shift begins with the Control Processor 10 issuing a control latch reset signal at $t_1$. The Control Processor 10, at $t_2$, then configures one or more of the functional planes to perform lateral shift operations, only one such configuration cycle being shown in FIG. 14. As an example, the control word necessar to configure a Memory Functional Plane to perform a lateral shift operation is provided in Table VII. This control word configures the Memory Functional Plane to perform an east lateral shift of the image contained in the functional plane. At $t_3$, again similar to the level shift operation, the Control Processor 10 issues the clock down-count number to the Clock Counter and Gate 16. The clock Down-Count Enable signal, issued at $t_4$, latches in the down-count number and initiates the down-count sequence which provides the preselected number of clock pulses on the CK line 38. In response, the data words are serially shifted out of the modules 102 and into their respective east nearest neighboring modules 102. At the conclusion of the down-count at $t_5$, the Clock Counter and Gate 16 generates and provides a clock count complete signal to the Computer System 12, indicating the completion of the lateral shift operation.

TABLE VII

| CONTROL WORD | BIT FUNCTION |
|---|---|
| (MSB) 0000 00 0 0 1 0 0 0 1 0 1 0 (LSB) | |
| —— | (1) input disabled |
| —— | (2) Output disabled |
| ——— | (3) Polarity non-inverted |
| ———— | (4) Clock Enabled |
| ————— | (5) LSB selected |
| —————— | (6) Recirculation disabled |
| ——————— | (7) North Data In disabled |
| ———————— | (8) East Data In enabled |
| ————————— | (9) South Data In disabled |
| —————————— | (10) West Data In disabled |
| ——————————— (11–16) Unused | |

C. Data I/O

The previous two basic operations generally deal with the movement, or translation, of images within the Array Processor 61. The Data I/O Operation, however, provides for the serial transfer of entire images between the Computer System 12 of the Control Processor 10 and an I/O Functional Plane 152 of the Array Processor 61.

The Data I/O Operation can be divided, for purposes of discussion, into Image Data Out and Image Data In suboperations. The system timing diagrams showing the principal portions of these operations are shown in FIGS. 15a-b, respectively. In the image data out operation, an image is transferred from the Control Processor 10 to the Array Processor 61. This transfer is accomplished through the use of a two-step procedure. Referring now to FIG. 15a, the first step begins at $t_1$ with all of the Configuration Latches 52 of the Processor Interface 63 being reset to their respective inactive states. At $t_2$, the Control Processor 10 executes a configuration cycle to configure an I/O Functional Plane 152 for a data input, lateral shift east operation. The necessary control word is essentially identical to that necessary to perform a Memory Functional Plane lateral shift east operation, as described in Section III(B), the only exception being that the EXIO bit (bit 11) is set to a logical 1 to enable the operation of the I/O input Data Receiver/Selector 154 and the I/O output Data Transmitter Circuit 155. Next, at $t_3$, the Computer System 12 provides the Converter 18 with the first data word of the image data set. As soon as it is stable on the bidirectional Data Bus 40, it is latched into the Converter 18 by a negative logic converter write signal on the W control line 44. The Computer System 12 then issues, at $t_4$, a clock down-count number to the Clock Counter and Gate 16, the number being preferably equal to the bit length of both the data word and the memory registers 118 of the I/O Functional Plane 152. At $t_5$, the Computer System 12 issues the clock count enable signal, thereby latching the down-count number into the Clock Counter and Gate 16 and initiating the down-count sequence. The Converter 18, in response to the clock pulses, serially transmits the image data word onto the DO line 48. The image data word is synchronously received and serially shifted into the Memory Register 118 of the Memory Module $102_{1,1}$ of the I/O Functional Plane 152. The down-count sequence concludes at $t_6$ with the entire image data word having been transferred to the corner module $102_{1,1}$ of the top row of the I/O Functional Plane's N×N array of Memory Modules 102.

The portion of the first step of the data output operation beginning at $t_3$ and ending at $t_6$ is then repeated N−1 times. Each time this operation is repeated, a new data word from the image data set is provided to the top row, corner module $102_{1,1}$, with the data words previously present there being successively laterally shifted to their east nearest neighboring modules $102_{1,1}$ to $102_{1,n}$. As should be apparent, an entire row of the I/O Functional Plane 152 is thus provided with a portion of the image.

The second step of the data output operation involves shifting the data contained in the top row of modules 102 south by one row. This can be accomplished by executing an image lateral shift south on the I/O Functional Plane 152. The lateral shift south is strictly analogous to the lateral shift east operation, with bit 9 being set instead of bit 8.

These two steps are successively repeated until the entire image data set has been transferred from the Control Processor 10 to the I/O Functional Plane 152 of the Array Processor 61. During the operation therefore, the flow of data words is west to east and north to south, with the initial data word ultimately being stored in the bottom row, corner module $102_{n,n}$ and the final data word being stored in the top row, corner module $102_{1,1}$. This orderly flow of data permits the image to be simply and efficiently mapped into the memory registers 118 of an I/O Functional Plane 152.

The data input operation, which transfers an image from the Array Processor 61 to the Computer System 12, is substantially analogous to the data output operation. Referring to FIG. 15b, at $t_1$, the Configuration Latches 52 of the Processor Interface 63 are reset and, at $t_2$, the Control Processor 10 executes a configuration cycle to configure an I/O Functional Plane 152 for the data input operation. This configuration is the same as used in the data output operation previously described, the EXIO signal enabling the data transmitter 155 as well as the Data Receiver/Selector 154. At $t_3$, however, the Computer System 12 issues the clock down-count number and, at $t_4$, initiates the down-count sequence by issuing the clock Down-Count Enable signal. In response to the CK pulses, data from the Memory Register 118 of the bottom row, corner module $102_{n,n}$, as present on its Nearest Neighbor Data Output line 160, is transmitted via the Data Transmitter Circuit 155 onto the DI line 46. The serial data so derived is synchronously clocked into the Converter 18. At the end of the down-count sequence, at $t_5$, the data word previously present in the bottom row, corner module $102_{n,n}$ has been transferred to the Converter 18. Thus, after the Computer System 12 receives the Clock Down-count Complete signal at $t_5$, it issues the negative logic converter read signal, at $t_6$, on the R control line 42 and reads the parallel converted data word present in the Converter 18. The sequence of events beginning with $t_3$ and ending with $t_6$ is then repeated N−1 times, thereby transferring all of the data words from the bottom row of modules 102 in the I/O Functional Plane 152 to the Computer System 12. Thus, in order to transfer an entire image from the Array Processor 61 to the Computer System 12, the above step is repeated in succession with a lateral shift south operation until the data initially present in the top row of modules has been shifted to the bottom row of modules and, further, shifted laterally through the bottom row, corner module $102_{n,n}$.

The image data out and image data in suboperations have been described separately for purposes of discussion only. They may be performed separately or simultaneously with the use of a concurrently operating serial-in, serial-out Converter 18. For simultaneous image exchange, the data in and data out suboperations are overlapped, so that prior to each down-count sequence, a data word is written into the Converter 18 and, subsequent to the down-count sequence, a data word is read from the Converter 18. Thus, during the down-count sequence, a data word from the Array Processor 61 is serially shifted into the Converter 18 to replace the data word that is simultaneously being shifted to the Array Processor 61. Considering the identical shifting sequences of the suboperations, it is apparent that the data words so exchanged are read from and written to the same relative location within their respective image data sets. Consequently, entire image data sets, or respective portions thereof, may be simply exchanged between the Control Processor 10 and the Array Processor 61.

It should also be understood from the discussion of the I/O Data Exchange Subsystem in Section II, supra, that any number of image data sets may be transferred simultaneously from an equal number of I/O Functional Planes 152 present in the Array Processor 61 to the Control Processor 10. To do so, the I/O Functional Planes 152 need only be commonly configured to transmit their respective data onto the DI bus line 46. Thus, during the down-count sequence, the AND of the corresponding data words from the several image data sets is provided to the Converter 18.

E. Example

The above-described basic operations of the Array Processor 61 can be utilized, in combination with a variety of types of functional planes, to perform practically any image processing algorithm. To illustrate the general operation of the Array Processor 61 executing an algorithm, an example is provided below.

UNSIGNED MULTIPLY EXAMPLE

The following "program" provides for the unsigned multiplication of one image data set by another. The multiplicand image data set is provided in one Memory Functional Plane (MEM 1) while the multiplier is in a second Memory Functional Plane (MEM 2). The data words present in the positionally corresponding modules of the Memory Functional Planes will be multiplied with the interim, and ultimately the final, product being present in the similarly corresponding modules of an Accumulator Functional Plane (ACC 1).

The multiplication algorithm that is implemented by the "program" uses the simple "shift and add" technique. As will be seen, the multiplier data words are shifted by one bit between each serial addition. While not essential to the example, a counter of functional plane (CNT 1) is provided to develop the bit sum of the multiplier data words in each of its positionally corresponding modules to illustrate its operation.

The multiplicand and multiplier data sets may be considered to be ancillary data sets to one another. The multiplication product and the counter bit sum data sets may be considered image derivative data sets.

For purposes of the example, the data words are given as 4 bits in length and the module memory registers are given as 8 bits in length. The data words are present in the lower 4 bit positions of their respective memory registers while the high 4 bit Positions are 0.

| | | PROGRAM | |
|---|---|---|---|
| Line No. | Functional Plane Addressed | Corresponding Configuration Bus Lines Set Active | Control Processor Operation Performed |
| 1 | ACC 1 | ADD, CLK | Configuration Cycle |
| 2 | CNT 1 | R | Configuration Cycle |
| 3 | | | issue 8 CK pulses |
| 4 | | | reset configuration latches |
| 5 | MEM 1 | REC, O̅, CLK | Configuration Cycle |
| 6 | MEM 2 | O | Configuration Cycle |
| 7 | ACC 1 | REC, I, CLK | Configuration Cycle |
| 8 | | | issue 8 CK pulses |
| 9 | | | reset configuration latches |
| 10 | MEM 1 | REC, CLK | Configuration Cycle |
| 11 | | | issue 7 CK pulses |
| 12 | | | reset configuration latches |
| 13 | MEM 2 | REC, CLK, O̅, | Configuration Cycle |
| 14 | CNT 1 | I | Configuration Cycle |
| 15 | CNT 1 | (all inactive) | Configuration Cycle |
| 16 | | | issue 1 CK pulse |
| 17 | | | reset configuration latches |

| | | -continued | |
|---|---|---|---|
| | | PROGRAM | |
| 18 | | | Do program lines 5 through 16 until they have been performed 4 times. |
| 19 | CNT 1 | SET | Configuration Cycle |
| 20 | | | reset configuration latches |

| Line Ref. No. | Comments |
|---|---|
| 1-4 | the ACC 1 data words are cleared and the modules are set for addition, and the CNT 1 counters are reset. |
| 5-9 | the bits of the multiplicand data words are successively ANDed with the present LSB's of the multiplier data words by means of the Data Exchange Subsystem and added to the previous accumulator data words, respectively. This conditional, or data dependent, addition effectively multiplies the multiplicands by the LSB of the multipliers. |
| 10-12 | the multiplicand data words are shifted left by one bit to adjust the decimal point for the next multiplication, the one bit shift left being accomplished by a 7 bit shift right. |
| 13-17 | the multiplier data words are shifted right by one bit so that the multiplicands are effectively multiplied by the next greater significant bit of the multiplier data words; the multiplier bits shifted are bit summed by the respective counters. |
| 18 | lines 5 through 17 are performed once for each significant bit of the multiplier data words, or a total of 4 times in the present example, so that the accumulator data words are the product of the respective multiplicand and multiplier data words. |
| 19-20 | the bit counts of the multiplier data words are latched into their respective counter module memory registers. |

Considering a single Elemental Processor having the following initial data words in its indicated modules, the above program would develop the following final product.

| Program Point | MEM 1 | MEM 2 | ACC 1 | CNT 1 |
|---|---|---|---|---|
| Initial | 00001110 | 00000101 | Don't care | (Don't care)* |
| Line 4 | 00001110 | 00000101 | 00000000 | (00000) |
| Line 17, loop 1 | 00011100 | 10000010 | 00001110 | (00001) |
| Line 17, loop 2 | 00111000 | 01000001 | 00001110 | (00001) |
| Line 17, loop 3 | 01110000 | 10100000 | 01000110 | (00010) |
| Line 17, loop 4 | 11100000 | 01010000 | 01000110 | (00010) |
| Line 19 | 11100000 | 01010000 | 01000110 | 00010 |

*The numbers in ( )'s being at the outputs of the counter circuit.

F. Summary

Thus, a general circuit design for the various functional types of modules has been disclosed. This design permits the modules to operate as substantially independent units while simplifying the necessary circuitry used to interconnect the modules. The logic circuits and their closely associated memory registers inherently accentuate the speed and efficiency of the Array Processor while allowing practically any data processing function to be implemented.

Obviously, many modifications and variations of the present invention are possible in light of the above description of the preferred embodiment. It is therefore to be understood that the invention may be practiced otherwise than as specifically described without departing from the spirit and the scope of the invention as set forth in the appended claims.

What is claimed is:

1. In a modular array processor associated with a control processor, said array processor being comprised of a plurality of elemental processors, each said elemental processor including a data exchange subsystem and a plurality of modules associated with said data exchange subsystem for the transfer of data thereinbetween, at least one of said modules of each said elemental processor comprising:
   (a) a memory register for storing data; and
   (b) an input programmable logic circuit having a plurality of control lines operatively associated with said control processor, said logic circuit being responsive to control signals provided thereby, said logic circuit including:
      (i) control signal selectable means for serially receiving data from said data exchange subsystems;
      (ii) control signal selectable means for combining said serially received data with serial data previously stored in said memory register and for serially storing the resultant serial data from said combination in said memory register in place of the previously stored data; and
      (iii) control signal selectable means for serially transmitting the resultant serial data stored in said memory register to said data exchange subsystem.

2. The device of claim 1 further comprising means for providing a clock signal to said memory register and said input programmable logic circuit such that the serial data transfers within said module occurs synchronously with one another.

3. The device of claim 2 wherein said serial data combining means is further characterized as including a bit serial full adder circuit such that the resultant serial data is the sum of the serial data provided to said full adder circuit.

4. The device of claim 3 wherein said module selectably performs the singular function of an accumulator.

5. The device of claim 2 wherein said serial data combining means is further characterized as performing a logical NAND function so as to produce resultant serial data that corresponds to the bit sequential NAND of the serial data provided thereto.

6. The device of claim 5 wherein said module selectably performs the singular function of a multiple input memory register.

7. The device of claim 2 wherein said serial data combining means is further characterized as including a comparator such that the resultant serial data is the then current bit sequential comparison status of the serial data provided thereto.

8. The device of claim 7 wherein said module selectably performs the singular function of a bit serial comparator.

9. The device of claim 2 wherein said serial data combining means is further characterized as including a counter such that said counter develops the bit sequential sum of the serial data provided thereto, said memory register being further characterized as a parallel in-serial out register so as to receive the sum developed by said counter and therefrom provide the resultant serial data.

10. The device of claim 9 wherein said module selectably performs the singular function of a bit serial bit counter.

11. A logic circuit module of a parallel array processor associated with a control processor comprising:
   (a) a bit serial data register having a plurality of data bit storage positions at least equal in number to the characteristic data word length of said array processor, said data register having data input and output terminals associated therewith;
   (b) a data selector and combiner circuit associated with a plurality of bit serial data sources including a bit serial data bus of said array processor and the output terminal of said data register, said selector and combiner circuit being responsive to bit parallel control signals provided from said control processor on a plurality of control input lines associated with said selector and combiner circuit whereby the serial data from a corresponding specific combination from one to all of said serial data sources is logically combined and provided to one or more serial data destinations including said bit serial data bus and the input terminal of said data register also as specifically selected by said control signals; and
   (c) means for providing a bit serial data transfer clock signal to said data register for synchronously clocking bit serial data into said data register from the selected ones of said serial data sources and out of said data register to the selected ones of said serial data destinations.

12. The device of claim 11 wherein said data selector and combiner is further characterized as including a bit serial data adder circuit, said clock means being associated with said adder circuit so as to provide said clock signal thereto, whereby said data selector and combiner synchronously sums the serial data provided thereto from the selected serial data sources and provides the resultant serial data to the selected serial data destinations.

13. The device of claims 11 and 12 wherein said logic circuit module is associated with a plurality of such modules essentially identical therewith so as to effectively form a plane array of said logic circuit modules, each said logic circuit module being further characterized in that said selector and combiner circuit is associated with at least one adjacent other logic circuit module and provides serial data thereto as a serial data source and receives serial data therefrom as a serial data destination.

14. A logic circuit module suitable for use in an array processor that includes a plurality of matrix arrayed elemental processors that, in turn, each include a plurality of said logic circuit modules commonly interconnected by a data bus, said array processor being associated with a control processor, each said logic circuit module comprising:
   (a) a multi-bit serial data register having data input and output terminals respectively associated with at least a first and second bit position of said data register; and
   (b) a bit serial data logic circuit including means for serially transferring data along one or more selectable data paths including data paths from said data bus to said input terminals of said data register, from said output terminal of said data register to said data bus, and from said output terminal to said input terminal of said data register, said logic circuit further including means for enabling the operation of said transferring means and selecting one or more of said data paths for the concurrent serial transfer of data therealong, said enabling means being responsive to control signals provided on a plurality of bit parallel input programmable control lines operatively associated with said control processor.

15. A logic circuit module of an array processor operatively associated with a control processor, said array processor comprising a plurality of elemental processors, each said elemental processor including a plurality of modules and a serial data bus line with each of said modules being connected to said data bus line for the inter-module transfer of data, each said elemental processor including at least one of said logic circuit modules as one of said modules thereof, wherein each said logic circuit module comprises a bit serial data register having a data input terminal and a data output terminal, a selector circuit having a plurality of control lines operatively associated with said control processor for receiving control signals therefrom, a plurality of data input lines operatively associated with a corresponding plurality of serial data sources, including said logic circuit module's associated serial data bus line and the output terminal of said serial data register, and a plurality of serial data output lines operatively associated with a corresponding plurality of serial data destinations, including said logic circuit module's associated serial data bus line and the input terminal of said serial data register, said selector circuit further having means for selectably enabling the reception and combination of serial data from one to all of said data sources to produce resultant serial data, the selection by said selector circuit of the specific ones of said serial data sources from which serial data is to be received, the specific ones of said serial data destinations to which serial data is to be sent, the enablement of the combining of the serial data received being determined by the control signals present on said control lines as established by said control processor, said logic circuit module further including means for providing a clock signal to said serial data register and said selector circuit whereby the respective transfer of serial data therethrough is mutually synchronized.

16. The device of claim 15 wherein said serial data combination means includes a multiple input NAND gate, the serial data obtained from each of said serial data sources being provided by their respective said serial data input lines to the inputs thereof and combined accordingly.

17. The device of claim 16 wherein said serial data combination means includes a one bit serial full adder circuit so as to permit at least two serial data sources to provide data thereto by their respective said serial data input lines and to be combined accordingly.

* * * * *